US007088700B2

(12) United States Patent
Lee et al.

(10) Patent No.: US 7,088,700 B2
(45) Date of Patent: Aug. 8, 2006

(54) APPARATUS AND METHOD FOR CODING/DECODING TFCI BITS IN AN ASYNCHRONOUS CDMA COMMUNICATION SYSTEM

(75) Inventors: Hyun-Woo Lee, Suwon-shi (KR); Jae-Yoel Kim, Kunpo-shi (KR); Sung-Ho Choi, Songnam-shi (KR); Kyeong-Cheol Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 988 days.

(21) Appl. No.: 09/974,656

(22) Filed: Oct. 9, 2001

(65) Prior Publication Data

US 2002/0075811 A1    Jun. 20, 2002

(30) Foreign Application Priority Data

Oct. 9, 2000     (KR) ............................... 2000-59359
Oct. 11, 2000    (KR) ............................... 2000-59863

(51) Int. Cl.
    *H04B 7/216*    (2006.01)
(52) U.S. Cl. .................. 370/342; 370/335; 370/252; 714/790; 714/786
(58) Field of Classification Search ........... 370/335, 370/342, 208, 209, 252; 714/786, 790
    See application file for complete search history.

(56) References Cited

U.S. PATENT DOCUMENTS 6,693,889 B1 * 2/2004 Abe et al. ................... 370/342
6,744,744 B1 * 6/2004 Tong et al. .................. 370/320
6,882,636 B1 * 4/2005 Kim et al. ................... 370/342
2001/0034872 A1 * 10/2001 Smallcomb ................. 714/786
2002/0131392 A1 * 9/2002 Dillinger et al. ............ 370/342
2002/0166093 A1 * 11/2002 Eroz et al. .................. 714/755

FOREIGN PATENT DOCUMENTS

EP              1 009 174        6/2000

OTHER PUBLICATIONS

Samsung Electronics Co., Ltd., "Text Proposal Regarding TFCI Coding for FDD", TSG-RAN Working Group 1, Meeting #7, Hanover, Germany, Aug. 30-Sep. 3, 1999.

(Continued)

*Primary Examiner*—Ricky Q. Ngo
*Assistant Examiner*—Nguyen Ngo
(74) *Attorney, Agent, or Firm*—Dilworth & Barrese LLP

(57) ABSTRACT

Disclosed is an apparatus for encoding TFCI bits in an asynchronous CDMA mobile communication system including a UE and a Node B for transmitting packet data to the UE. A TFCI bit generator creates the TFCI bits, the number of which is variable depending on an information bit ratio of the first channel to the second channel. A code length information generator generates code length information for setting a length of a codeword according to the information bit ratio. A Walsh code generator generates first to fifth basis Walsh codewords. A sequence generator generates an all-1 sequence. A mask generator generates first to fourth basis masks. First to tenth multipliers multiply the TFCI bits by the first to fifth basis Walsh codewords, the all-1 sequence and the first to fourth basis masks, respectively. An adder adds outputs of the first to tenth multipliers. A puncturer punctures a codeword output from the adder according to the code length information.

31 Claims, 13 Drawing Sheets

OTHER PUBLICATIONS

Samsung: "New Optimal Coding for Extended TFCI with Almost No Complexity Increase (rev. 2)", TSG-RAN Working Group 1, Meeting #7, Hanover, Germany, Aug. 30-Sep. 3, 1999.

3rd Generation Partnership Project; Technical Specification Group Radio Access Network; Multiplexing and Channel Coding (FDD) (Release 1999).

* cited by examiner

Frame structure of downlink DPCH

APPARATUS AND METHOD FOR CODING/DECODING TFCI BITS IN AN ASYNCHRONOUS CDMA COMMUNICATION SYSTEM

PRIORITY

This application claims priority to an application entitled "Apparatus and Method for Coding/Decoding TFCI Bits in an Asynchronous CDMA Communication System" filed in the Korean Industrial Property Office on Oct. 9, 2000 and assigned Ser. No. 2000-59359, and an application entitled "Apparatus and Method for Coding/Decoding TFCI Bits in an Asynchronous CDMA Communication System" filed in the Korean Industrial Property Office on Oct. 11, 2000 and assigned Ser. No. 2000-59863, the contents of both of which are hereby incorporated by reference.

BACKGROUND OF THE INVENTION

1. Field of the Invention

The present invention relates generally to an asynchronous CDMA mobile communication system, and in particular, to an apparatus and method for coding/decoding TFCI (Transport Format Combination Indicator) bits for transmission of DSCH (Downlink Shared Channel) data in a hard split mode.

2. Description of the Related Art

A downlink shared channel (DSCH) is commonly used by a plurality of users on a time-division basis. The DSCH is associated with a dedicated channel (DCH) for every user. The DCH includes a dedicated physical control channel (DPCCH) and a dedicated physical data channel (DPDCH). In particular, the DPCCH is used in association with the DSCH. Therefore, the DPCCH is used as a physical control channel for the associated DCH and the DSCH. The DPCCH includes information on a TFCI (Transport Format Combination Indicator), one of many control signals. The TFCI is information indicating a transport format of data transmitted over the physical channel. Therefore, the TFCI information includes information on both the DCH and the DSCH.

The TFCI information is comprised of 10 bits, and the 10-bit TFCI information is encoded into 30-bit. The encoded 30 bits are transmitted on the DPCCH.

A method for simultaneously transmitting TFCI for the DCH and TFCI for the DSCH over the DPCCH is divided into two methods: a hard split method and a local split method.

The TFCI for the DCH is referred to as a TFCI field#1 or a first TFCI, and the TFCI for the DSCH is referred to as a TFCI field#2 or a second TFCI.

In the hard split method, the TFCI field#1 and the TFCI field#2 are indicated with 5 bits, respectively, and then, encoded with a (15,5) punctured bi-orthogonal code. Thereafter, the 15-bit TFCI field#1 and TFCI field#2 are multiplexed into 30-bit TFCI field#1 and TFCI field#2, and then, transmitted over the physical channel.

In the logical split method, the TFCI field#1 and the TFCI field#2 are encoded into one TFCI with a (30,10) punctured Reed-Muller code (or sub-code second order Reed-Muller code). In this method, the information bits of the TFCI field#1 and the TFCI field#2 are divided in a specific ratio. That is, the 10 information bits of the TFCI field#1 and the TFCI field#2 are divided in a ratio of 1:9, 2:8, 3:7, 4:6, 5:5, 6:4, 7:3, 8:2 or 9:1. The TFCI field#1 and the TFCI field#2, after being divided in a specific ratio, are encoded with a block code, i.e., the (30,10) punctured Reed-Muller code.

FIG. 1 illustrates a structure of a transmitter based on the hard split method. Referring to FIG. 1, a (15,5) bi-orthogonal encoder 100 encodes a 5-bit TFCI field#1 for the DCH into 15 coded symbols, and provides the 15 coded symbols to a multiplexer 110. At the same time, a (15,5) bi-orthogonal encoder 105 encodes a 5-bit TFCI field#2 for the DSCH into 15 coded symbols, and provides the 15 coded symbols to the multiplexer 110. The multiplexer 110 then time-multiplexes the 15 coded symbols from the encoder 100 and the 15 coded symbols from the encoder 105, and outputs 30 symbols after arrangement. A multiplexer 120 time-multiplexes the 30 symbols output from the multiplexer 110 and other signals, and provides its output to a spreader 130.

The spreader 130 spreads the output signal of the multiplexer 120 with a spreading code provided from a spreading code generator 135. A scrambler 140 scrambles the spread signal with a scrambling code provided from a scrambling code generator 145.

FIG. 2 illustrates a procedure for exchanging signaling messages and data between a Node B and RNCs (Radio Network Controllers) for the hard split method defined in the existing 3GPP (3rd Generation Partnership Project). Referring to FIG. 2, if transmission data of the DSCH is generated, a radio link controller (RLC) 11 of an SRNC (Serving RNC) 10 transmits the DSCH data to a MAC-D (Medium Access Control-Dedicated channel) 13 of the SRNC 10 in step 101. A primitive transmitted at this moment is MAC-D-Data-REQ. In step 102, the MAC-D 13 of the SRNC 10 transmits DSCH data received from the RLC 11 to a MAC-C (MAC-Common channel) 21 of a CRNC 20. A primitive transmitted at this moment is MAC-C/SH-Data-REQ. In step 103, the MAC-C 21 of the CRNC (Control RNC) 20 determines (schedules) a transmission time for the DSCH data received in the step 102 from the MAC-D 13 of the SRNC 10, and then, transmits the DSCH data and its associated TFI (Transport Format Indicator) to an L1 (Layer 1) 30 of a Node B (hereinafter, the term "Node B" refers to a base station). A primitive transmitted at this moment is MPHY-Data-REQ. In step 104, the MAC-D 13 of the SRNC 10 transmits transmission data of the DCH and its associated TFI to the L1 30 of the Node B. A primitive transmitted at this moment is MPHY-Data-REQ. The data transmitted in the step 103 is independent of the data transmitted in the step 104, and the L1 30 of the Node B generates a TFCI which is divided into a TFCI for the DCH and a TFCI for the DSCH. In the steps 103 and 104, the data and the TFIs are transmitted using a data frame protocol.

After receiving the data and the TFIs in the steps 103 and 104, the L1 30 of the Node B transmits the DSCH data over a physical DSCH (PDSCH) to an L1 41 of a UE (User Equipment; hereinafter, the term "UE" refers to a mobile station) 40 in step 105. Thereafter, in step 106, the L1 30 of the Node B transmits the TFCI to the L1 41 of the UE 40 using the DPCH. The L1 30 of the Node B transmits the TFCIs created with the TFIs received in the steps 103 and 104, using the fields for the DCH and the DSCH.

FIG. 3 illustrates a procedure for exchanging signaling messages and data between Node Bs for the logical split method. Referring to FIG. 3, if DSCH data to be transmitted is generated, an RLC 301 of an RNC 300 transmits the DSCH data to a MAC-D 303 of an RNC 300 in step 201. A primitive transmitted at this moment is MAC-D-Data-REQ. Upon receipt of the DSCH data from the RLC 301, the MAC-D 303 transmits the DSCH data to a MAC-C/SH (MAC-Common/Shared channel) 305 in step 202. A primitive transmitted at this moment is MAC-C/SH-Data-REQ. Upon receipt of the DSCH data, the MAC-C/SH 305 determines a transmission time of the DSCH data and then transmits a TFCI associated with the DSCH data to MAC-D 303 in step 203. After transmitting the TFCI to the MAC-D 303 in the step 203, the MAC-C/SH 305 transmits the DSCH data to an L1 307 of the Node B in step 204. The DSCH data is transmitted at the time determined (scheduled) in the step 203. Upon receipt of the TFCI for the DSCH data transmitted from the MAC-C/SH 305 in the step 203, the MAC-D 303 determines a TFI1 (TFI for the DSCH) and transmits the TFI1 to the L1 307 of the Node B in step 205. The MAC-D 303 can also transmit the TFCI instead of the TFI. A primitive transmitted at this moment is MPHY-Data-REQ.

After transmitting the TFI1 (TFI for the DSCH), the MAC-D 303 determines a TFI2 (TFI for the DCH) and transmits the DCH data along with the TFI2 to the L1 307 of the Node B in step 206. The MAC-D 303 can also transmit the TFCI instead of the TFI. A primitive transmitted at this moment is MPHY-Data-REQ. The DSCH data transmitted in the step 204 and the TFI transmitted in the step 205 are related to the time determined in the step 203. That is, the TFI in the step 205 is transmitted to a UE 310 over the DPCCH at a frame immediately before the DSCH data in the step 204 is transmitted over the PDSCH. In the steps 204, 205 and 206, the data and the TFIs are transmitted using a frame protocol. Particularly, in the step 206, the TFCI is transmitted through a control frame. In step 207, the L1 307 of the Node B transmits the DSCH data over the PDSCH to an L1 311 of the UE 310. In step 208, the L1 307 of the Node B creates a TFCI using the TFIs received in the steps 205 and 206, and transmits the created TFCI over the DPCH to the L1 311 of the UE 310. More specifically, the L1 307 of the Node B creates the TFCI using the respective TFCIs or TFIs received in the steps 205 and 206, and transmits the created TFCI on the DPCCH.

Summarizing the logical split method, the MAC-C/SH 305 transmits DSCH scheduling information and TFCI information of the DSCH to the MAC-D 303 in the step 203. This is because in order to encode the TFCI for the DSCH and the TFCI for the DCH in the same coding method, the MAC-D 303 must simultaneously transmit the DSCH scheduling information and the TFCI information to the L1 307 of the Node B. Therefore, when the MAC-D 303 has data to transmit, there occurs a delay until the MAD-D 303 receives the scheduling information and the TFCI information from the MAC-C 305 after transmitting the data to the MAC-C 305. In addition, when the MAC-C 305 is separated from the MAC-D 303 on the Iur, i.e., when the MAC-C 305 exists in the DRNC (Drift RNC) and the MAC-D 303 exists in the SRNC, the scheduling information and the TFCI information are exchanged on the Iur, causing an increase in the delay.

Compared with the logical split method, the hard split method can reduce the delay because information transmission to the MAC-D is not required after scheduling in the MAC-C. This is possible because the Node B can independently encode the TFCI for the DCH and the TFCI for the DSCH in the hard split method. In addition, when the MAC-C is separated from the MAC-D on the Iur, i.e., when the MAC-C exists in the DRNC and the MAC-D exists in the SRNC, the scheduling information is not exchanged on the Iur, preventing an increase in the delay. However, according to the foregoing description, the information amounts (bits) of the TFCIs for the DCH and the DSCH are fixedly divided in a ratio of 5 bits to 5 bits, so that it is possible to express a maximum of 32 information for the DCH and 32 information for the DSCH. Therefore, when there are more than 32 information for the DSCH or DCH, the hard split mode cannot be used.

SUMMARY OF THE INVENTION

It is, therefore, an object of the present invention to provide an apparatus and method for performing multiple coding using a single encoder structure in a mobile communication system.

It is another object of the present invention to provide an apparatus and method for multiplexing symbols coded in different coding techniques.

It is farther another object of the present invention to provide an apparatus and method for encoding 10 input bits in a ratio of 1:9, 2:8, 3:7, 4:6, 5:5, 6:4, 7:3, 8:2 or 9:1 even in a hard split mode as done in a logical split mode.

To achieve the above and other objects, there is provided an apparatus for encoding TFCI (Transport Format Combination Indicator) bits depending on an information bit ratio of a first channel to a second channel in a CDMA mobile communication system, comprising: a first encoder for encoding a first TFCI bits representing a transport format combination of the first channel to generate first encoded symbols, and puncturing the first encoded symbols according to a predetermined first puncturing positions; a second encoder for encoding a second TFCI bits representing a transport format combination of the second channel to generate second encoded symbols, and puncturing the second encoded symbols according to a predetermined second puncturing positions; and a multiplexer for multiplexing the output symbols of the first and second encoders to transmit the symbols on the second channel.

To achieve the above and other objects, there is provided a method for transmitting TFCI(Transport Format Combination Indicator) bits in a CDMA mobile communication system including a UE and a Node B for transmitting packet data to the UE over a first channel, first and second encoded TECI bits over a second channel established to transmit control data for the first channel, comprising the steps of: encoding a first TFCI bits representing a transport format combination of the first channel to generate first encoded symbols and a second TFCI bits representing a transport format combination of the second channel to generate second encoded symbols respectively; and puncturing the first encoded symbols and the second encoded symbols according to first and second puncturing positions to generate the first encoded TFCI bits and the second encoded TFCI bits; multiplexing the first encoded TFCI bits and the second encoded TFCI bits; and transmitting the multiplexed encoded TFCI bits over the second channel.

Preferably, the first channel is a downlink shared channel (DSCH) and the second channel is a dedicated channel (DCH).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
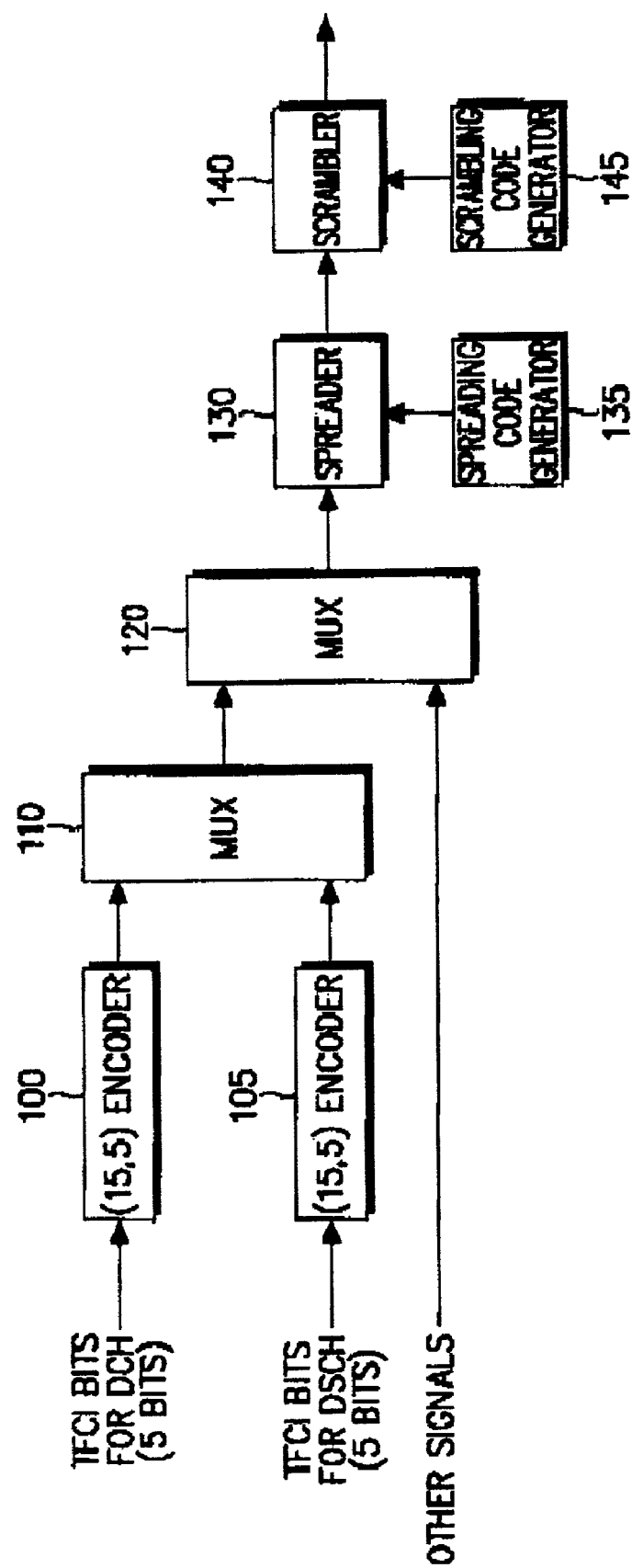
FIG. 1 is a diagram illustrating a structure of a transmitter having a (15,5) encoder based on a hard split technique in a general asynchronous CDMA mobile communication system.
Figure 2:
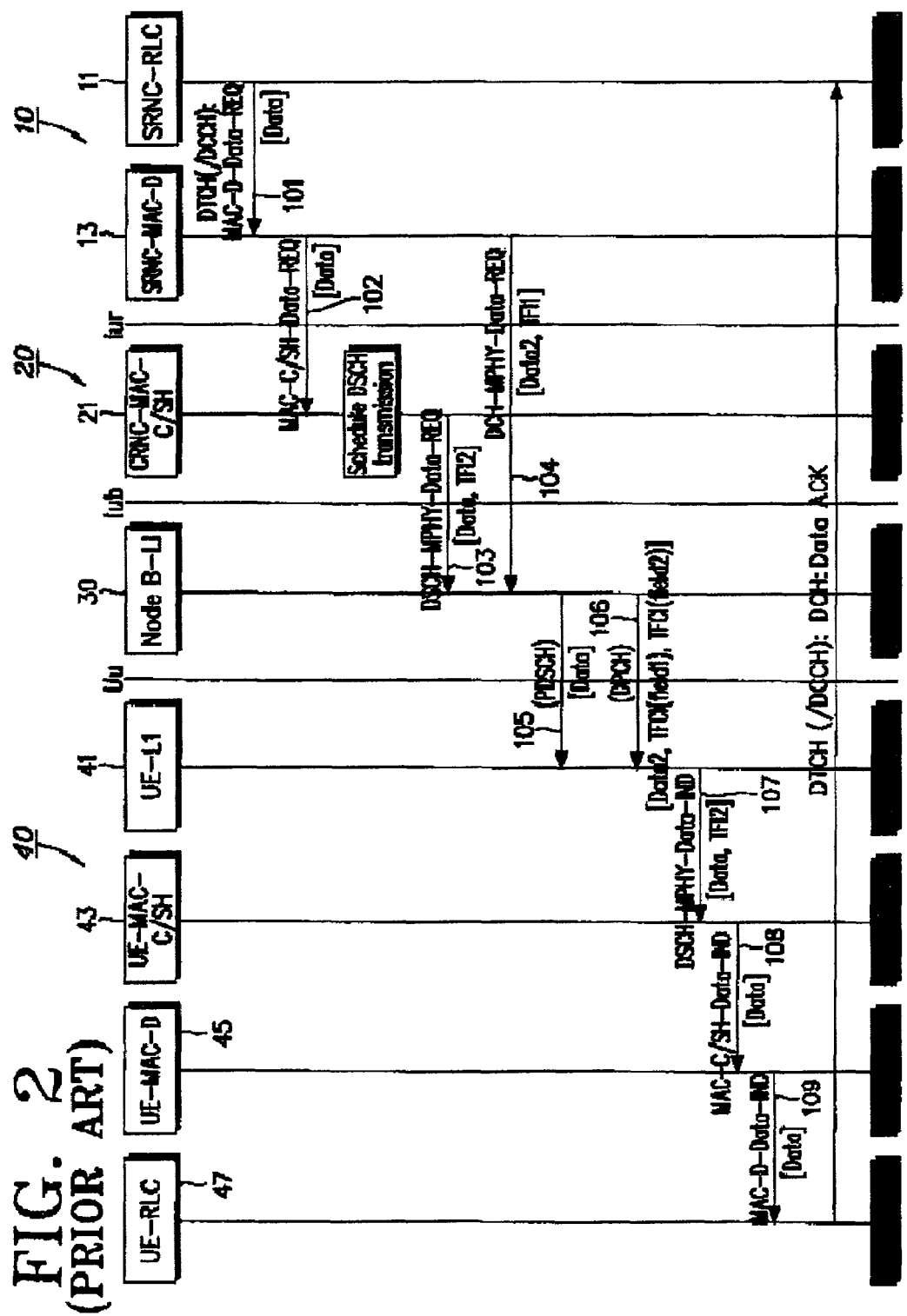
FIG. 2 is a flow diagram illustrating a procedure for exchanging signaling messages and data between a Node B and radio network controllers (RNCs) for the hard split technique in the general asynchronous CDMA mobile communication system.
Figure 3:
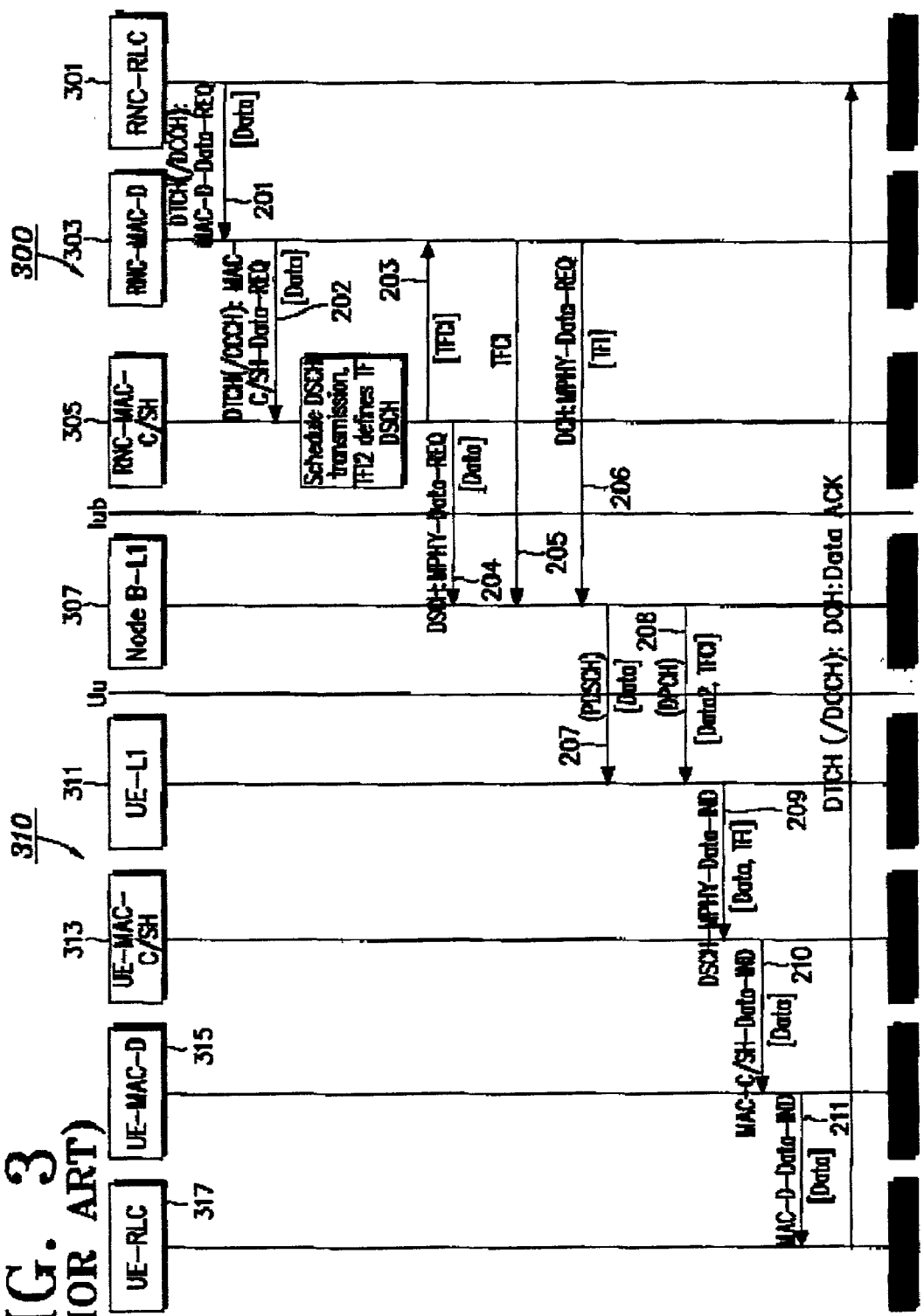
FIG. 3 is a flow diagram illustrating a procedure for exchanging signaling messages and data between a Node B and RNCs for a logical split technique in the general asynchronous CDMA mobile communication system.

A preferred embodiment of the present invention will be described herein below with reference to the accompanying drawings. In the following description, well-known functions or constructions are not described in detail since they would obscure the invention in unnecessary detail.

In the case of the hard split technique, the number of information bits for the DSCH and the DCH is 10 in total, and the 10 information bits are divided in a ratio of 1:9, 2:8, 3:7, 4:6 5:5, 6:4, 7:3, 8:2, or 9:1 for the DSCH and the DCH, and then, subjected to coding.

A physical layer transmits 30 coded TFCI symbols for one frame at a coding rate ⅓. When the TFCI information bits are divided in a specific ratio as stated above, it is preferable to divide the coded symbols in the same ratio as the specific ratio, thereby to maintain the respective coding rates. For example, when 10 input bits are divided in a ratio of 1:9, the 30 output symbols are divided in a ratio of 3:27 at a coding rate ⅓. When the 10 input bits are divided in a ratio of 2:8, the 30 output symbols are divided in a ratio of 6:24. When the 10 input bits are divided in a ratio of 3:7, the 30 output symbols are divided in a ratio of 9:21. When the 10 input bits are divided in a ratio of 4:6, the 30 output symbols are divided in a ratio of 12:18, and so on.

Therefore, when a ratio of the information bits is 1:9, a (3,1) encoder for outputting 3 coded symbols by receiving 1 input bit and a (27,9) encoder for outputting 27 coded symbols by receiving 9 input bits are required. When a ratio of the information bits is 2:8, a (6,2) encoder for outputting 6 coded symbols by receiving 2 input bits and a (24,8) encoder for outputting 24 coded symbols by receiving 8 input bits are required. When a ratio of the information bits is 3:7, a (9,3) encoder for outputting 9 coded symbols by receiving 3 input bits and a (21,7) encoder for outputting 21 coded symbols by receiving 7 input bits are required. When a ratio of the information bits is 4:6, a (12,4) encoder for outputting 12 coded symbols by receiving 4 input bits and an (18,6) encoder for outputting 18 coded symbols by receiving 6 input bits are required, and so on. Therefore, in order for the 10 encoders to have high performance and low hardware complexity, they are required to operate in the same structure.

In general, the performance of linear error correcting codes is measured by Hamming distance distribution in the error correcting codewords. The Hamming distance is defined as the number of non-zero symbols in each codeword. For a codeword "0111", its Hamming distance is 3. The minimum Hamming distance is called a minimum distance $d_{min}$. As the minimum distance increases, the linear error correcting code has superior error correcting performance. For details, see "The Theory of Error-Correcting Codes", F. J. Macwilliams, N. J. A. Sloane, North-Holland.

In addition, for the low hardware complexity, it is preferable to shorten a code with the longest length, i.e., a (32,10) code in order to operate the encoders with different lengths in the same structure. It is necessary to puncture the coded symbol in order to shorten the (32,10) code. In puncturing the (32,10) code, the minimum distance of the code undergoes a change according to the puncturing position. Therefore, it is preferable to calculate the puncturing position such that the punctured code has an optimal minimum distance.

For example, for an optimal (6,2) code, it is most preferable to repeat a (3,2) simplex code twice among the above codes in terms of the minimum distance. Shown in Table 1 is the relationship between the input information bits of the (3,2) simplex code and the output (3,2) simplex codewords.

TABLE 1

| Input Information Bits | (3,2) Simplex Codewords |
| --- | --- |
| 00 | 000 |
| 01 | 101 |
| 10 | 011 |
| 11 | 110 |

If the (3,2) simplex codewords are repeated twice, the relationship between the input information bits and the output (3,2) simplex codewords is given as shown in Table 2.

TABLE 2

| Input Information Bits | Twice-Repeated (3,2) Simplex Codewords |
| --- | --- |
| 00 | 000 000 |
| 01 | 101 101 |
| 10 | 011 011 |
| 11 | 110 110 |

However, the twice-repeated (3,2) simplex codewords can be implemented by shortening the existing (16,4) Reed-Muller code. Describing an example of the shortening method, the (16,4) Reed-Muller code is a linear combination of 4 basis codewords of length 16, where '4' is the number of input information bits. Receiving only 2 bits among the 4 input information bits is equivalent to using a linear combination of only 2 basis codewords among the 4 basis codewords of length 16 and not using the remaining codewords. In addition, by restricting use of the basis codewords and then puncturing 10 symbols among 16 symbols, it is possible to operate the (16,4) encoder as a (6,2) encoder. Table 3 shows the shortening method.

TABLE 3

| InputInfo Bits | Codewords | | | | | | | | | | | | | | | |
|---|---|---|---|---|---|---|---|---|---|---|---|---|---|---|---|---|
| 0000   | 0(*) | 0 | 0 | 0 | 0(*) | 0 | 0 | 0 | 0(*) | 0(*) | 0(*) | 0(*) | 0(*) | 0(*) | 0(*) | 0(*) |
| A 0001 | 0(*) | 1 | 0 | 1 | 0(*) | 1 | 0 | 1 | 0(*) | 1(*) | 0(*) | 1(*) | 0(*) | 1(*) | 0(*) | 1(*) |
| B 0010 | 0(*) | 0 | 1 | 1 | 0(*) | 0 | 1 | 1 | 0(*) | 0(*) | 1(*) | 1(*) | 0(*) | 0(*) | 1(*) | 1(*) |
| 0011   | 0(*) | 1 | 1 | 0 | 0(*) | 1 | 1 | 0 | 0(*) | 1(*) | 1(*) | 0(*) | 0(*) | 1(*) | 1(*) | 0(*) |
| C 0100 | 0 | 0 | 0 | 0 | 1 | 1 | 1 | 1 | 0 | 0 | 0 | 0 | 1 | 1 | 1 | 1 |
| 0101   | 0 | 1 | 0 | 1 | 1 | 0 | 1 | 0 | 0 | 1 | 0 | 1 | 1 | 0 | 1 | 0 |
| 0110   | 0 | 0 | 1 | 1 | 1 | 1 | 0 | 0 | 0 | 0 | 1 | 1 | 1 | 1 | 0 | 0 |
| 0111   | 0 | 1 | 1 | 0 | 1 | 0 | 0 | 1 | 0 | 1 | 1 | 0 | 1 | 0 | 0 | 1 |
| D 1000 | 0 | 0 | 0 | 0 | 0 | 0 | 0 | 0 | 1 | 1 | 1 | 1 | 1 | 1 | 1 | 1 |
| 1001   | 0 | 1 | 0 | 1 | 0 | 1 | 0 | 1 | 1 | 0 | 1 | 0 | 1 | 0 | 1 | 0 |
| 1010   | 0 | 0 | 1 | 1 | 0 | 0 | 1 | 1 | 1 | 1 | 0 | 0 | 1 | 1 | 0 | 0 |
| 1011   | 0 | 1 | 1 | 0 | 0 | 1 | 1 | 0 | 1 | 0 | 0 | 1 | 1 | 0 | 0 | 1 |
| 1100   | 0 | 0 | 0 | 0 | 1 | 1 | 1 | 1 | 1 | 1 | 1 | 1 | 0 | 0 | 0 | 0 |
| 1101   | 0 | 1 | 0 | 1 | 1 | 0 | 1 | 0 | 1 | 0 | 1 | 0 | 0 | 1 | 0 | 1 |
| 1110   | 0 | 0 | 1 | 1 | 1 | 1 | 0 | 0 | 1 | 1 | 0 | 0 | 0 | 0 | 1 | 1 |
| 1111   | 0 | 1 | 1 | 0 | 1 | 0 | 0 | 1 | 1 | 0 | 0 | 1 | 0 | 1 | 1 | 0 |

Referring to Table 3, every (16,4) codeword is a linear combination of the 4 basis codewords (represented by A, B, C, D in Table 3) of length 16. In order to obtain the (6,2) code, only the upper 2 codewords among the 4 basis codewords are used. Then, the remaining lower 12 codewords are automatically unused and only the upper 4 codewords are used. Besides, in order to convert the upper 4 codewords into codewords length 6, it is necessary to puncture 10 symbols out of 16 symbols. It is possible to obtain the twice-repeated (3,2) simplex codewords shown in Table 2 by puncturing the symbols indicated by (*) in Table 3 and then collecting the remaining 6 coded symbols. Herein, a description will be made of a structure of an encoder for creating a (3,1) optimal code and a (27,9) optimal code used for the information bit (amount) ratio of 1:9 structure of an encoder for creating a (6,2) optimal code and a (24,8) optimal code use for the information bit ratio of 2:8, a structure of an encoder for creating a (9,3) optumal code and a (21,7) optimal code used for the information bit ratio of 3:7, a structure of an encoder for creating a (12,4) optimal code and an (18,6) optimal code use for the information bit ratio of 4:6, and a structure of an encoder for creating a (15,5)optimal code and a (15,5) optimal code used for the information bit ratio of 5:5, by shortening a (32,10) sub-code of the second order Reed-Muller code.

An exemplary embodiment of the present invention provides an apparatus and method for dividing 10 information bits in a ratio of 1:9, 2:8, 3:7, 4:6, 5:5, 6:4, 7:3, 8:2 or 9:1 before coding even in the hard split mode, as done in the logical split mode.

FIRST EMBODIMENT

Figure 4:
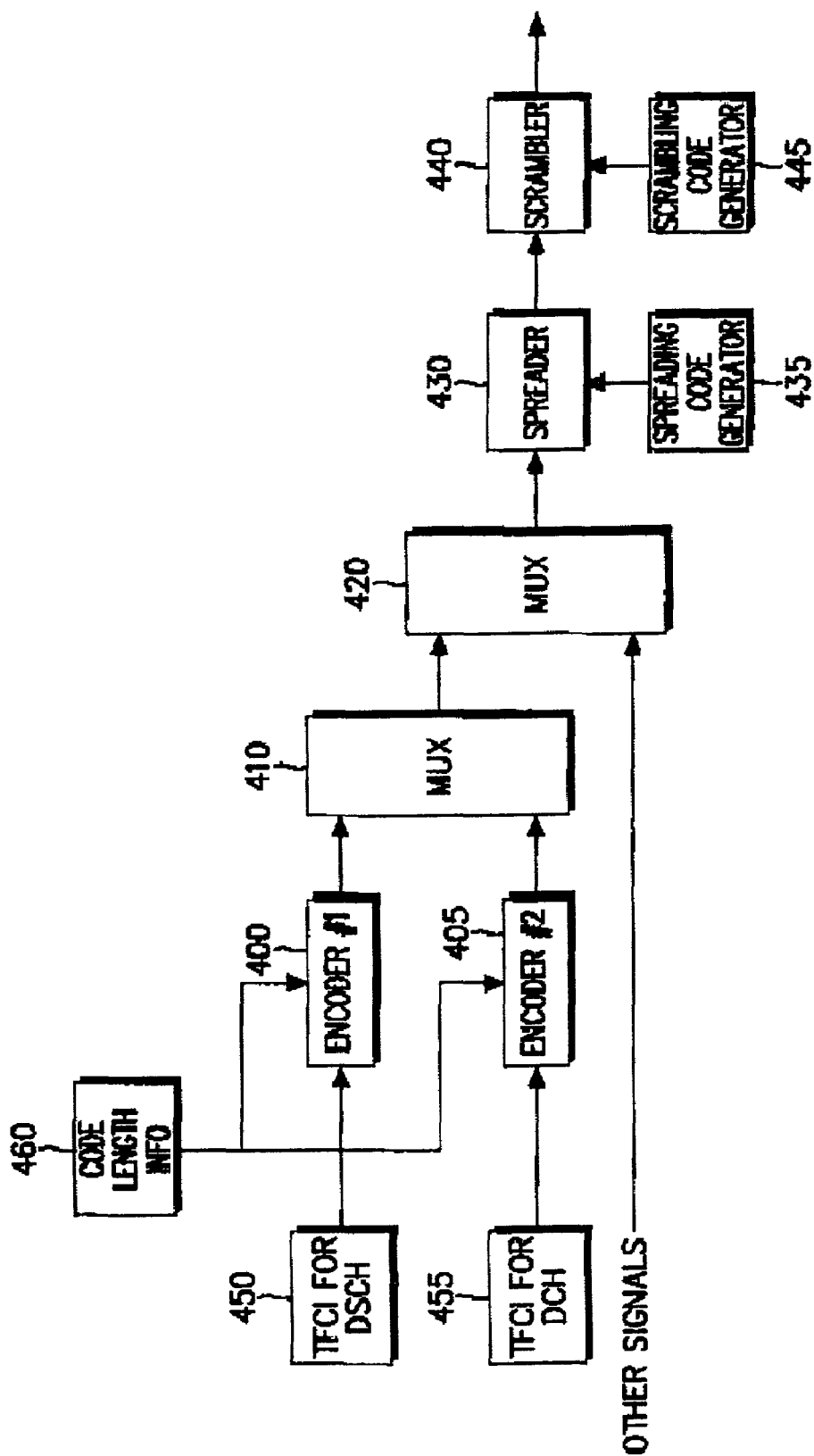
FIG. 4 is a block diagram illustrating a structure of a transmitter for encoding TFCI bits for the DSCH and TFCI bits for the DCH using different encoding techniques according to an embodiment of the present invention.

FIG. 4 illustrates a structure of a transmitter according to an embodiment of the present invention. Referring to FIG. 4, TFCI bits for the DSCH and TFCI bits for the DCH, divided according to the information bit ratio, are provided to first and second encoders 400 and 405, respectively. Here, the TFCI bits for the DSCH are referred to as a TFCI field#1 or first TFCI bits, while the TFCI bits for the DCH are referred to as a TFCI field#2 or second TFCI bits. The TFCI bits for the DSCH are generated from a first TFCI bit generator 450, and the TFCI bits for the DCH are generated from a second TFCI bit generator 455. The first and second TFCI bits can have different ratios stated above, according to their information bit ratio. In addition, a length control signal indicating code length information, i.e., information on a length value of the codeword set according to the information bit ratio, is provided to the first and second encoders 400 and 405. The code length information is generated from a code length information generator 460, and has a value variable according to lengths of the first TFCI bits and the second TFCI bits.

When the information bit ratio is 6:4, the encoder 400 receives the 6-bit TFCI for the DSCH and outputs 18 coded symbols in response to a length control signal for allowing the encoder 400 to operate as an (18,6) encoder for outputting an 18-symbol codeword by receiving 6 input bits, while the encoder 405 receives the 4-bit TFCI for the DCH and outputs 12 coded symbols in response to a length control signal for allowing the encoder 405 to operate as a (12,4) encoder for outputting a 12-symbol codeword by receiving 4 input bits. When the information bit ratio is 7:3, the encoder 400 receives the 7-bit TFCI for the DSCH and outputs 21 coded symbols in response to a length control signal for allowing the encoder 400 to operate as a (21,7) encoder for outputting a 21-symbol codeword by receiving 7 input bits, while the encoder 405 receives the 3-bit TFCI for the DCH and outputs 9 coded symbols in response to a length control signal for allowing the encoder 405 to operate as a (9,3) encoder for outputting a 9-symbol codeword by receiving 3 input bits. When the information bit ratio is 8:2, the encoder 400 receives the 8-bit TFCI for the DSCH and outputs 24 coded symbols in response to a length control signal for allowing the encoder 400 to operate as a (24,8) encoder for outputting a 24-symbol codeword by receiving 8 input bits, while the encoder 405 receives the 2-bit TFCI for the DCH and outputs 6 coded symbols in response to a length control signal for allowing the encoder 405 to operate as a (6,2) encoder for outputting a 6-symbol codeword by receiving 2 input bits.

When the information bit ratio is 9:1, the encoder 400 receives the 9-bit TFCI for the DSCH and outputs 27 coded symbols in response to a length control signal for allowing the encoder 400 to operate as a (27,9) encoder for outputting a 27-symbol codeword by receiving 9 input bits, while the encoder 405 receives the 1-bit TFCI for the DCH and outputs 3 coded symbols in response to a length control signal for allowing the encoder 405 to operate as a (3,1) encoder for outputting a 3-symbol codeword by receiving 1 input bit, and so on.

Figure 5:
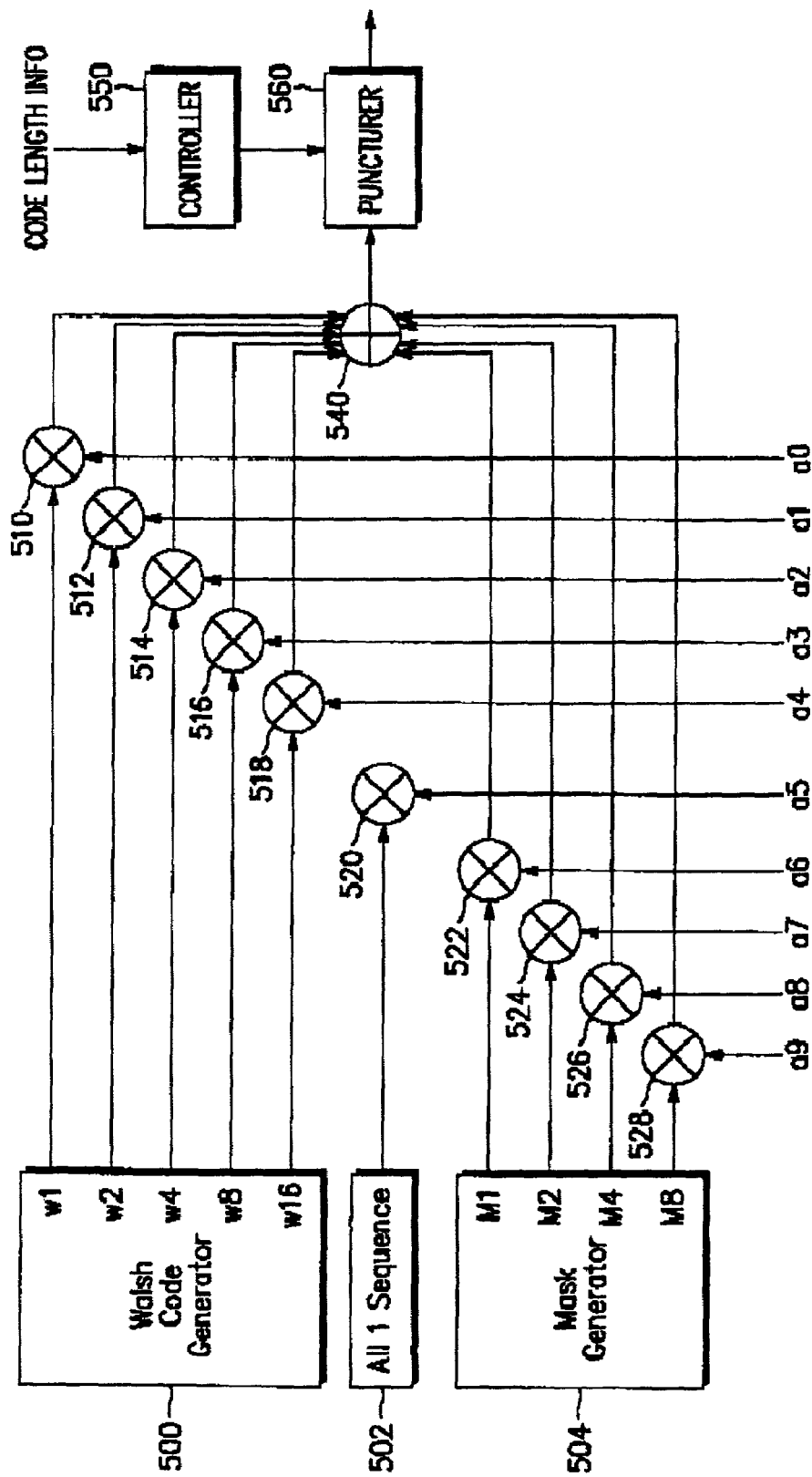
FIG. 5 is a detailed diagram illustrating the encoder shown in FIG. 4.

FIG. 5 illustrates a detailed structure of the encoders 400 and 405. An operation of the encoders will be described for the respective information bit ratios.

1) Information Bit Ratio=1:9

For the information bit ratio of 1:9, the encoder 400 serves as a (3,1) encoder, while the encoder 405 serves as a (27,9) encoder. Therefore, operations of the encoders 400 and 405 will be separately described below.

First, an operation of the encoder 400 will be described.

One input bit is provided to the encoder 400 as an input bit a0, and at the same time, the remaining input bits a1, a2, a3, a4, a5, a6, a7, a8 and a9 are all filled with '0'. The input bit a0 is applied to a multiplier 510, the input bit a1 to a multiplier 512, the input bit a2 to a multiplier 514, the input bit a3 to a multiplier 516, the input bit a4 to a multiplier 518, the input bit a5 to a multiplier 520, the input bit a6 to a multiplier 522, the input bit a7 to a multiplier 524, the input bit a8 to a multiplier 526, and the input bit a9 to a multiplier 528. At the same time, a Walsh code generator 500 generates a basis codeword W1=10101010101010110101010101010100. The multiplier 510 then multiplies the input bit a0 by the basis codeword W1 in a symbol unit, and provides its output to an exclusive OR (XOR) operator 540. Further, the Walsh code generator 500 generates other basis codewords W2, W4, W8 and W16, and provides them to the multiplier 512, 514, 516 and 518, respectively. An all-1 code generator 502 generates an all-1 basis codeword and provides the generated all-1 basis codeword to the multiplier 520. A mask generator 504 generates basis codewords M1, M2, M4 and M8, and provides the generated basis codewords M1, M2, M4 and M8 to the multipliers 522, 524, 526 and 528, respectively. However, since the input bits a1, a2, a3, a4, a5, a6, a7, a8 and a9 applied to the multipliers 512, 514, 516, 518, 520, 522, 524, 526 and 528 respectively are all 0s, the multipliers 512, 514, 516, 518, 520, 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to the output value of the multiplier 510. The 32 symbols output from the exclusive OR operator 540 are provided to a puncturer 560. At this moment, a controller 550 receives code length information and provides the puncturer 560 with a control signal indicating puncturing positions based on the code length. The puncturer 560 then punctures $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31_{st}$ coded symbols among a total of 32 coded symbols of $0^{th}$ to $31_{st}$ symbols according to the length control signal output from the controller 550. In other words, the puncturer 560 punctures 29 symbols among 32 coded symbols, and thus outputs 3 non-punctured coded symbols.

Next, an operation of the encoder 405 will be described.

Nine input bits are provided to the encoder 405 as the input bits a0, a1, a2, a3, a4, a5, a6, a7 and a8, and at the same time, the remaining input bit a9 is-filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111100000001111111100, and the multiplier 518 with the basis codeword W16=00000000000000001111111111111101. Then, the multiplier 510 multiplies the basis codeword W1 by the input bit a0 in the symbol unit and provides its output to the exclusive OR operator 540, the multiplier 512 multiplies the basis codeword W2 by the input bit al in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides ram its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540. Further, the mask generator 504 provides the multiplier 522 with the basis codeword M1=0101 0000 1100 0111 1100 0001 1101 1101, the multiplier 524 with the basis codeword M2=0000 0011 1001 1011 1011 0111 0001 1100, and the multiplier 526 with the basis codeword M4=0001 0101 1111 0010 0110 1100 1010 1100. Then, the multiplier 522 multiplies the basis codeword M1 by the input bit a6 in the symbol unit and provides its output to the exclusive OR operator 540, the multiplier 524 multiplies the basis codeword M2 by the input bit a7 in the symbol unit and provides its output to the exclusive OR operator 540, and the multiplier 526 multiplies the basis codeword M4 by the input bit a8 in the symbol unit and provides its output to the exclusive OR operator 540. Further, the mask generator 504 generates the basis codeword M8, and provides the generated basis codeword M8 to the multiplier 528. However, since the input bit a9 applied to the multiplier 528 is 0, the multiplier 528 outputs 0 (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 520, 522, 524 and 526. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $2^{nd}$, $8^{th}$, $19^{th}$ and $20^{th}$ coded symbols among a total of 32 coded symbols of $0^{th}$ to $31^{st}$ symbols according to the control signal output from the controller 550. In other words, the puncturer 560 punctures 5 symbols among 32 coded symbols, and thus outputs 27 non-punctured coded symbols.

2) Information Bit Ratio=2:8

For the information bit ratio of 2:8, the encoder 400 serves as a (6,2) encoder, while the encoder 405 serves as a (24,8) encoder. Therefore, operations of the encoders 400 and 405 will be separately described below.

First, an operation of the encoder 400 will be described.

Two input bits are provided to the encoder 400 as the input bits a0 and a1, and at the same time, the remaining input bits a2, a3, a4, a5, a6, a7, a8 and a9 are all filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010101010101010100, and the multiplier 512 with the basis codeword W2=01100110011001101100110011001100. The multiplier 510 multiplies the basis codeword W1 by the input bit a0 in the symbol unit and provides its output to the exclusive OR operator 540, and the multiplier 512 multiplies the basis codeword W2 by the input bit a1 in the symbol unit and provides its output to the exclusive OR operator 540. Further, the Walsh code generator 500 generates other basis codewords W4, W8 and W16, and provides them to the multipliers 514, 516 and 518, respectively. The all-1 code generator 502 generates an all-1 basis codeword and provides the generated all-1 basis codeword to the multiplier 520. The mask generator 504 generates the basis codewords M1, M2, M4 and M8, and provides the generated basis codewords M1, M2, M4 and M8 to the multipliers 522, 524, 526 and 528, respectively. However, since the input bits a2, a3, a4, a5, a6, a7, a8 and a9 applied to the multipliers 514, 516, 518, 520, 522, 524, 526 and 528 are all 0s, the multipliers 514, 516, 518, 520, 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510 and 512. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $3^{rd}$, $7^{th}$, $8^{th}$, $9^{th}$, $10^{th}$, $11^{th}$, $12^{t}$, $13^{th}$, $14^{th}$, $15^{th}$, $16^{th}$, $17^{th}$, $18^{t}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 26 symbols among 32 coded symbols, and thus outputs 6 non-punctured coded symbols, $0^{th}$, $1^{st}$, $2^{nd}$, $4^{th}$, $5^{th}$, $6^{th}$.

Next, an operation of the encoder 405 will be described.

Eight input bits are provided to the encoder 405 as the input bits a0, a1, a2, a3, a4, a5, a6 and a7, and at the same time, the remaining input bits a8 and a9 are filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010101010101010101010100, the multiplier 512 with the basis codeword W2=01100110011001101100110011001100, the multiplier 514 with the basis codeword W4=00011110000111100001111000011110, the multiplier 516 with the basis codeword W8=00000001111111100000001111111100, and the multiplier 518 with the basis codeword W16=00000000000000001111111111111101. Then, the multiplier 510 multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540. Further, the mask generator 504 provides the multiplier 522 with the basis codeword M1=0101 0000 1100 0111 1100 0001 1101 1101, and the multiplier 524 with the basis codeword M2=0000 0011 1001 1011 1011 0111 0001 1100. The multiplier 522 then multiplies the basis codeword M1 by the input bit a6 in the symbol unit and provides its output to the exclusive OR operator 540, and the multiplier 524 multiplies the basis codeword M2 by the input bit a7 in the symbol unit and provides its output to the exclusive OR operator 540. Further, the mask generator 504 generates the basis codewords M4 and M8, and provides the generated basis codewords M4 and M8 to the multipliers 526 and 528, respectively. However, since the input bits a8 and a9 applied to the multipliers 526 and 528 are all 0s, the multipliers 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 520, 522 and 524. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $1^{st}$, $7^{th}$, $13^{th}$, $15^{th}$, $20^{th}$, $25^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 8 symbols among 32 coded symbols, and thus outputs 24 non-punctured coded symbols.

3) Information Bit Ratio=3:7

For the information bit ratio of 3:7, the encoder 400 serves as a (9,3) encoder, while the encoder 405 serves as a (21,7) encoder. Therefore, operations of the encoders 400 and 405 will be separately described below.

First, an operation of the encoder 400 will be described.

Three input bits are provided to the encoder 400 as the input bits a0, a1 and a2, and at the same time, the remaining input bits a3, a4, a5, a6, a7, a8 and a9 are all filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, and the multiplier 514 with the basis codeword W4=00011110000111100011110000111100. The multiplier 510 then multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, and the multiplier 514 multiplies the basis codeword W4 by the input bit a2 in the symbol unit and provides its output to the exclusive OR operator 540. Further, the Walsh code generator 500 generates other basis codewords W8 and W16, and provides them to the multipliers 516 and 518, respectively. The all-1 code generator 502 generates an all-1 basis codeword and provides the generated all-1 basis codeword to the multiplier 520. The mask generator 504 generates the basis codewords M1, M2, M4 and M8, and provides the generated basis codewords M1, M2, M4 and M8 to the multipliers 522, 524, 526 and 528, respectively. However, since the input bits a3, a4, a5, a6, a7, a8 and a9 applied to the multipliers 516, 518, 520, 522, 524, 526 and 528 are all 0s, the multipliers 516, 518, 520, 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512 and 514. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $7^{th}$, $8^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 23 symbols among 32 coded symbols, and thus outputs 9 non-punctured coded symbols.

Next, an operation of the encoder 405 will be described.

Seven input bits are provided to the encoder 405 as the input bits a0, a1, a2, a3, a4, a5 and a6, and at the same time, the remaining input bits a7, a8 and a9 are filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111100000001111111100, and the multiplier 518 with the basis codeword W16=00000000000000011111111111111101. Then, the multiplier 510 multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540. Further, the mask generator 504 provides the multiplier 522 with the basis codeword M1=0101 0000 1100 0111 1100 0001 1101 1101. The multiplier 522 then multiplies the basis codeword M1 by the input bit a6 in the symbol unit and provides its output to the exclusive OR operator 540. Further, the mask generator 504 generates the basis codewords M2, M4 and M8, and provides the generated basis codewords M2, M4 and M8 to the multipliers 524, 526 and 528, respectively. However, since the input bits a7, a8 and a9 applied to the multipliers 524, 526 and 528 are all 0s, the multipliers 524, 526 and 528 output 0s (no signal) to the exclusive OR operator 540, thus not affecting the output of the exclusive OR operator 540. That is, a value determined by XORing the output values of the multipliers 510 ,512, 514, 516, 518, 520, 522, 524, 526 and 528 by the exclusive OR operator 540 is equal to a value determined by XORing the output values of the multipliers 510, 512, 514, 516, 518, 520 and 522. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 coded symbols of $0^{th}$ to $31^{st}$ symbols according to the control signal output from the controller 550. In other words, the puncturer 560 punctures 11 symbols among 32 coded symbols, and thus outputs 21 non-punctured coded symbols.

4) Information Bit Ratio=4:6

For the information bit ratio of 4:6, the encoder 400 serves as a (12,4) encoder, while the encoder 405 serves as a (18,6) encoder. Therefore, operations of the encoders 400 and 405 will be separately described below.

First, an operation of the encoder 400 will be described.

Four input bits are provided to the encoder 400 as the input bits a0, a1, a2 and a3, and at the same time, the remaining input bits a4, a5, a6, a7, a8 and a9 are all filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, and the multiplier 516 with the basis codeword W8=00000001111111100000001111111100. The multiplier 510 then multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, and the multiplier 516 multiplies the basis codeword W8 by the input bit a3 in the symbol unit and provides its output to the exclusive OR operator 540. Further, the Walsh code generator 500 generates the other basis codeword W16, and provides it to the multiplier 518. The all-1 code generator 502 generates an all-1 basis codeword and provides the generated all-1 basis codeword to the multiplier 520. The mask generator 504 generates the basis codewords M1, M2, M4 and M8, and provides the generated basis codewords M1, M2, M4 and M8 to the multipliers 522, 524, 526 and 528, respectively. However, since the input bits a4, a5, a6, a7, a8 and a9 applied to the multipliers 518, 520, 522, 524, 526 and 528 are all 0s, the multipliers 518, 520, 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514 and 516. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 20 symbols among 32 coded symbols, and thus outputs 12 non-punctured coded symbols.

Next, an operation of the encoder 405 will be described.

Six input bits are provided to the encoder 405 as the input bits a0, a1, a2, a3, a4 and a5, and at the same time, the remaining input bits a6, a7, a8 and a9 are filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111100000001111111100, and the multiplier 518 with the basis codeword W16=00000000000000011111111111111101. Then, the multiplier 510 multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. In addition, the all-1 code generator 502 generates an all-1 basis codeword of length 32 and provides the generated all-1 basis codeword to the multiplier 520. The multiplier 520 then multiplies the all-1 basis codeword by the input bit a5 in the symbol unit and provides its output to the exclusive OR operator 540. Further, the mask generator 504 generates the basis codewords M1, M2, M4 and M8, and provides the generated basis codewords M1, M2, M4 and M8 to the multipliers 522, 524, 526 and 528, respectively. However, since the input bits a6, a7, a8 and a9 applied to the multipliers 522, 524, 526 and 528 are all 0s, the multipliers 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518 and 520. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 coded symbols of $0^{th}$ to $31^{st}$ symbols according to the control signal output from the controller 550. In other words, the puncturer 560 punctures 14 symbols among 32 coded symbols, and thus outputs 18 non-punctured coded symbols.

5) Information Bit Ratio=5:5

For the information bit ratio of 5:5, the encoders 400 and 405 both serve as a (15,3) encoder. An operation of the encoders 400 and 405 will be described below.

Five input bits are provided to the encoder 400 as the input bits a0, a1, a2, a3 and a4, and at the same time, the remaining input bits a5, a6, a7, a8 and a9 are all filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111000000001111111100, and the multiplier 518 with the basis codeword W16=00000000000000001111111111111101. The multiplier 510 then multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540. Further, the all-1 code generator 502 generates an all-1 basis codeword and provides the generated all-1 basis codeword to the multiplier 520. The mask generator 504 generates the basis codewords M1, M2, M4 and M8, and provides the generated basis codewords M1, M2, M4 and M8 to the multipliers 522, 524, 526 and 528, respectively. However, since the input bits a5, a6, a7, a8 and a9 applied to the multipliers 520, 522, 524, 526 and 528 are all 0s, the multipliers 520, 522, 524, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516 and 518. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, $12^{th}$, $13^{th}$, $14^{th}$, $30^{th}$, $31^{st}$ coded symbols among a total of 32 coded symbols of $0^{th}$ to $31^{st}$ symbols according to the control signal output from the controller 550. In other words, the puncturer 560 punctures 17 symbols among 32 coded symbols, and thus outputs 15 non-punctured coded symbols.

It is natural that the (21,7) encoder according to the first embodiment sequentially receives the 7 input bits a0, a1, a2, a3, a4, a5 and a6. However, in this method, the minimum distance of the linear block code becomes 7, not 8 which is the minimum distance of an optimal code. It is possible for the (21,7) encoder to create an optimal code having the minimum distance 8 by simply modifying the input bits. In the following description, a method for creating the optimal (21,7) code according to a second embodiment will be provided. The second embodiment is similar in operation to the first embodiment except the (21,7) encoder and decoder. Therefore, only the operation of the (21,7) encoder and decoder will be described in the second embodiment.

Second Embodiment

An operation of the encoder 405 of FIG. 4 operating with a (21,7) code according to the second embodiment will be described with reference to FIG. 5.

Seven input bits are provided to the encoder 405 as the input bits a0, a1, a2, a3, a4, a6 and a7, and at the same time, the remaining input bits a5, a8 and a9 are filled with '0'. The input bit a0 is applied to the multiplier 510, the input bit a1 to the multiplier 512, the input bit a2 to the multiplier 514, the input bit a3 to the multiplier 516, the input bit a4 to the multiplier 518, the input bit a5 to the multiplier 520, the input bit a6 to the multiplier 522, the input bit a7 to the multiplier 524, the input bit a8 to the multiplier 526, and the input bit a9 to the multiplier 528. At the same time, the Walsh code generator 500 provides the multiplier 510 with the basis codeword W1=10101010101010110101010101010100, the multiplier 512 with the basis codeword W2=01100110011001101100110011001100, the multiplier 514 with the basis codeword W4=00011110000111100011110000111100, the multiplier 516 with the basis codeword W8=00000001111111000000001111111100, and the multiplier 518 with the basis codeword W16=00000000000000001111111111111101. The multiplier 510 then multiplies the basis codeword W1 by the input bit a0 in the symbol unit and provides its output to the exclusive OR operator 540, the multiplier 512 multiplies the basis codeword W2 by the input bit a1 in the symbol unit and provides its output to the exclusive OR operator 540, the multiplier 514 multiplies the basis codeword W4 by the input bit a2 in the symbol unit and provides its output to the exclusive OR operator 540, the multiplier 516 multiplies the basis codeword W8 by the input bit a3 in the symbol unit and provides its output to the exclusive OR operator 540, and the multiplier 518 multiplies the basis codeword W16 by the input bit a4 in the symbol unit and provides its output to the exclusive OR operator 540.

In addition, the mask generator 504 provides the multiplier 522 with the basis codeword M1=0101 0000 1100 0111 1100 0001 1101 1101, and the multiplier 524 with the basis codeword M2=0000 0011 1001 1011 1011 0111 0001 1100. The multiplier 522 then multiplies the basis codeword M1 by the input bit a6 in the symbol unit and provides its output to the exclusive OR operator 540, and the multiplier 524 multiplies the basis codeword M2 by the input bit a7 in the symbol unit and provides its output to the exclusive OR operator 540. Further, the all-1 code generator 502 generates an all-1 basis codeword of length 32 and provides the generated all-1 basis codeword to the multiplier 520, and the mask generator 504 generates the basis codewords M4 and M8, and provides the generated basis codewords M4 and M8 to the multipliers 526 and 528, respectively. However, since the input bits a5, a8 and a9 applied to the multipliers 520, 526 and 528 are all 0s, the multipliers 520, 526 and 528 output 0s (no signal) to the exclusive OR operator 540, thus not affecting the output of the exclusive OR operator 540. That is, a value determined by XORing the output values of the multipliers 510, 512, 514, 516, 518, 520, 522, 524, 526 and 528 by the exclusive OR operator 540 is equal to a value determined by XORing the output values of the multipliers 510, 512, 514, 516, 518, 522 and 524. The 32 symbols output from the exclusive OR operator 540 are provided to the puncturer 560. At this moment, the controller 550 receives code length information and provides the puncturer 560 with a control signal indicating puncturing positions based on the code length. The puncturer 560 then punctures $0^{th}$, $2^{nd}$, $6^{th}$, $7^{th}$, $9^{th}$, $10^{th}$, $12^{th}$, $14^{th}$, $15^{th}$, $29^{th}$, $30^{th}$ coded symbols among a total of 32 coded symbols of $0^{th}$ to $31^{st}$ symbols according to the control signal output from the controller 550. In other words, the puncturer 560 punctures 11 symbols among 32 coded symbols, and thus outputs 21 non-punctured coded symbols.

An operation of the decoder 605 of FIG. 6 operating with a (21,7) code according to the second embodiment will be described with reference to FIG. 7.

Figure 7:
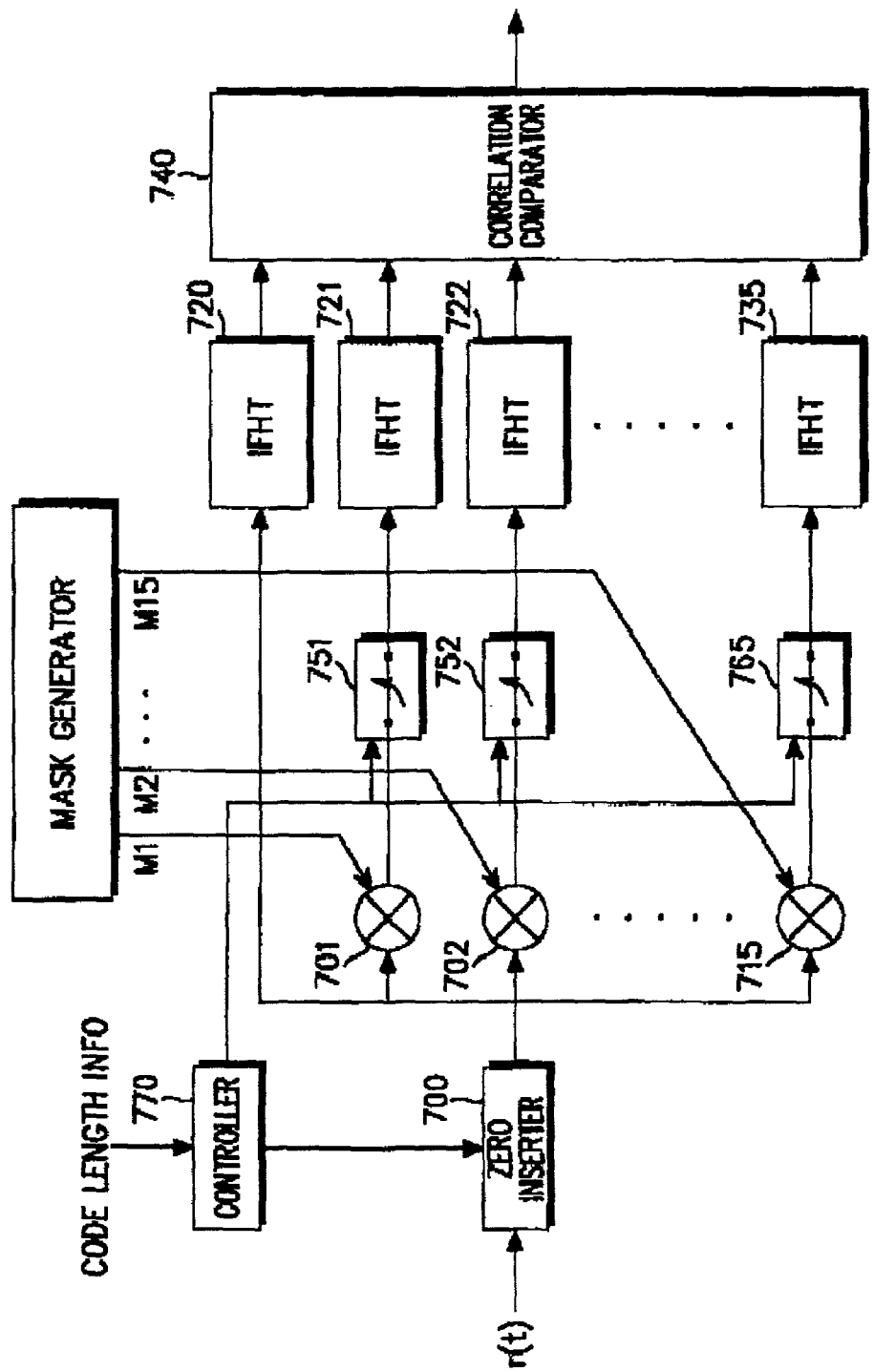
FIG. 7 is a detailed diagram illustrating the decoder shown in FIG. 6.

Referring to FIG. 7, received symbols r(t) are provided to a zero inserter 700, and at the same time, code length information is provided to a controller 770. The controller 770 stores puncturing positions (0, 2, 6, 7, 9, 10, 12, 14, 15, 29, 30) based on a code length of the received symbols, and provides the stored puncturing position information to the zero inserter 700. For example, the controller 770 provides the zero inserter 700 with information on the above-stated 11 puncturing positions for a coding rate (21,7). The zero inserter 700 then inserts 0s in the puncturing positions according to the puncturing position control information, and outputs a symbol stream of length 32. The symbol stream is provided to an inverse fast Hadamard transformer (IFHT) 720 and multipliers 701 to 715. The signals provided to the multipliers 701 to 715 are multiplied by mask codeword M1 to M15 generated from the basis codeword M1, M2, M4, M8 at a mask generator 710, respectively. The output symbols of the multipliers 701 to 715 are provided to switches 752 to 765, respectively. For the (21,7) encoder which uses two basis codewords(M1, M2), only the three switches (752, 753, 754) are connected. Then, the four IFHTs (720, 721, 722, 723, 724) perform inverse fast Hadamard transform(IFHT) on their received 32 symbols. The inverse fast Hadamard transform is a function to obtain a correlation values between the received 32 symbols and length 32 Walsh codes. Each inverse fast Hadamard transformer (IFHT) 720, 721, 722, 723 output the highest correlation value with the received symbols and the Walsh index correspond to the highest correlation value. A correlation comparator 740 then compares the correlation vlaues provided from the IFHTs(720, 721, 722, 723), and output a Walsh index correspond to the most high correlation value. It can be achieved decoded TFCI bits from the Walsh index (5 bits) and the mask codeword index (2 bits) correspond to the most high correlation value. In this embodiment, since the encoder sequentially receives first 5 input bits, and then, receives the remaining 2 input bits after inserting one 0 bit, the decoded TFCI bits are combination of the Walsh index, the mask codeword index and 0 inserted between the Walsh index and the mask codeword index.

Hitherto, the operations of the encoders 400 and 405 have been described for the information bit ratios of 9:1, 8:2, 7:3 and 6:4.

After the above coding operations at a transmitter, the coded symbols output from the encoders 400 and 405 are time-multiplexed by a multiplexer 410, thus outputting a multiplexed 30-symbol signal.

Next, a description will be made as to how the multiplexer 410 multiplexes the encoded DSCH and DCH. The multiplexer 410 multiplexes the coded symbols output from the encoders 400 and 405 such that the 30 coded symbols are arranged as uniformly as possible.

In the following description, the TFCI for the DCH and the TFCI for the DSCH are assumed to be comprised of m bits and n bits, respectively. A possible ratio of m to n is (m:n)=1:9, 2:8, 3:7, 4:6, 5:5, 6:4, 7:3, 8:2 or 9:1.

First, a case of m>n will be considered. Even in the case of n>m, it is possible to arrange the TFCI bits for the DCH and the DSCH in the following manner through an interchange of n and m.

In the above-described coding method, if the TFCIs for the DCH and the DSCH are respectively comprised of m bits and n bits, then the numbers of created bits after the coding are m*3 and n*3, respectively. Therefore, in order to select the positions for transmitting the created coded symbols, the 30 bits to be transmitted over the DPCCH are divided by 10 bits, and then m bits determined by dividing the m*3 bits for the DCH into 3 equal parts and n bits determined by dividing the n*3 bits into 3 equal parts are arranged.

Next, a description will be made of a method for arranging the m bits for the DCH and the n bits for the DSCH using given 10 bits.

Let L indicate an $L^{th}$ bit of the 10 bits.

$$F(k) = \left\lfloor \frac{m}{n} * k \right\rfloor, k = 0, 1, 2, \ldots, n \quad (1)$$

$$G(k) = \left\lceil \frac{F(k) - F(k-1)}{2} \right\rceil, k = 0, 1, 2, \ldots, n \quad (2)$$

In Equations (1) and (2), $\lfloor x \rfloor$ indicates a maximum value among the integers smaller than or equal to a given value x, and $\lceil x \rceil$ indicates a minimum value among the integers larger than or equal to the given value x.

In Equation (2), F(−1) is defined as zero (0). That is, F(−1)=0. A method for arranging the m bits for the DCH and the n bits for the DSCH using the above formulas is defined by Equation (3) below. The bits for the DSCH are sequentially arranged to n L values among the 10 L values.

$$L = F(l-1) + G(l) + l \quad (3)$$

In Equation (3), l ($1 \leq l \leq n$) indicates an $l^{th}$ bit among the n bits for the DSCH.

Therefore, Equation (3) is used in calculating a value corresponding to the $l^{th}$ position among the 10 bits for the DSCH.

The m bits for the DCH are arranged to L values other than the values given by Equation (3) among the 10 L values. This can be defined by Equation (4) below.

$$F(l-2) + G(l-1) + l \leq L \leq F(l-1) + G(l) + l - 1 \quad (4)$$

In Equation (4), the value l has a range of $1 \leq l \leq n$.

Table 4 below shows F(k) and G(k) for the respective cases of m:n=9:1, 8:2, 7:3, 6:4 and 5:5.

TABLE 4

| m:n | F(k) | F(1) | F(2) | F(3) | F(4) | F(5) |
|---|---|---|---|---|---|---|
| | G(k) | G(1) | G(2) | G(3) | G(4) | G(5) |
| | DSCH Position | | | | | |
| 5:5 | 1 | 2 | 3 | 4 | 5 | |
| | 1 | 1 | 1 | 1 | 1 | |
| | 2 | 4 | 6 | 8 | 10 | |
| 6:4 | 1 | 3 | 4 | 6 | | |
| | 1 | 1 | 1 | 1 | | |
| | 2 | 4 | 7 | 9 | | |
| 7:3 | 2 | 4 | 7 | | | |
| | 1 | 1 | 1 | | | |
| | 2 | 5 | 8 | | | |
| 8:2 | 4 | 8 | | | | |
| | 2 | 2 | | | | |
| | 3 | 8 | | | | |
| 9:1 | 9 | | | | | |
| | 4 | | | | | |
| | 5 | | | | | |

Figure 9:
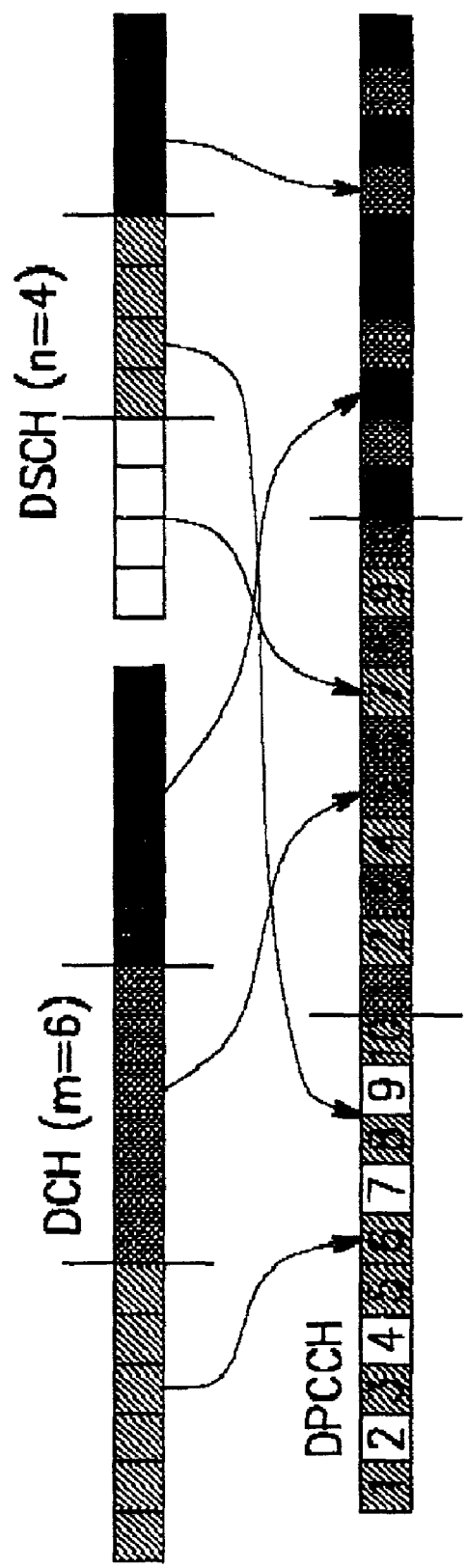
FIG. 9 is a diagram illustrating a method for multiplexing coded symbols encoded in different coding techniques.

FIG. 9 is a diagram for explaining how to match the TFCI bits for the DCH and the TFCI bits for the DSCH to 30 DPCCH bits, for m:n=6:4. As shown in Table 4, for m:n=6:4, the position of the DSCH corresponds to the case where the L values are 2, 4, 7 and 9.

Figure 8:
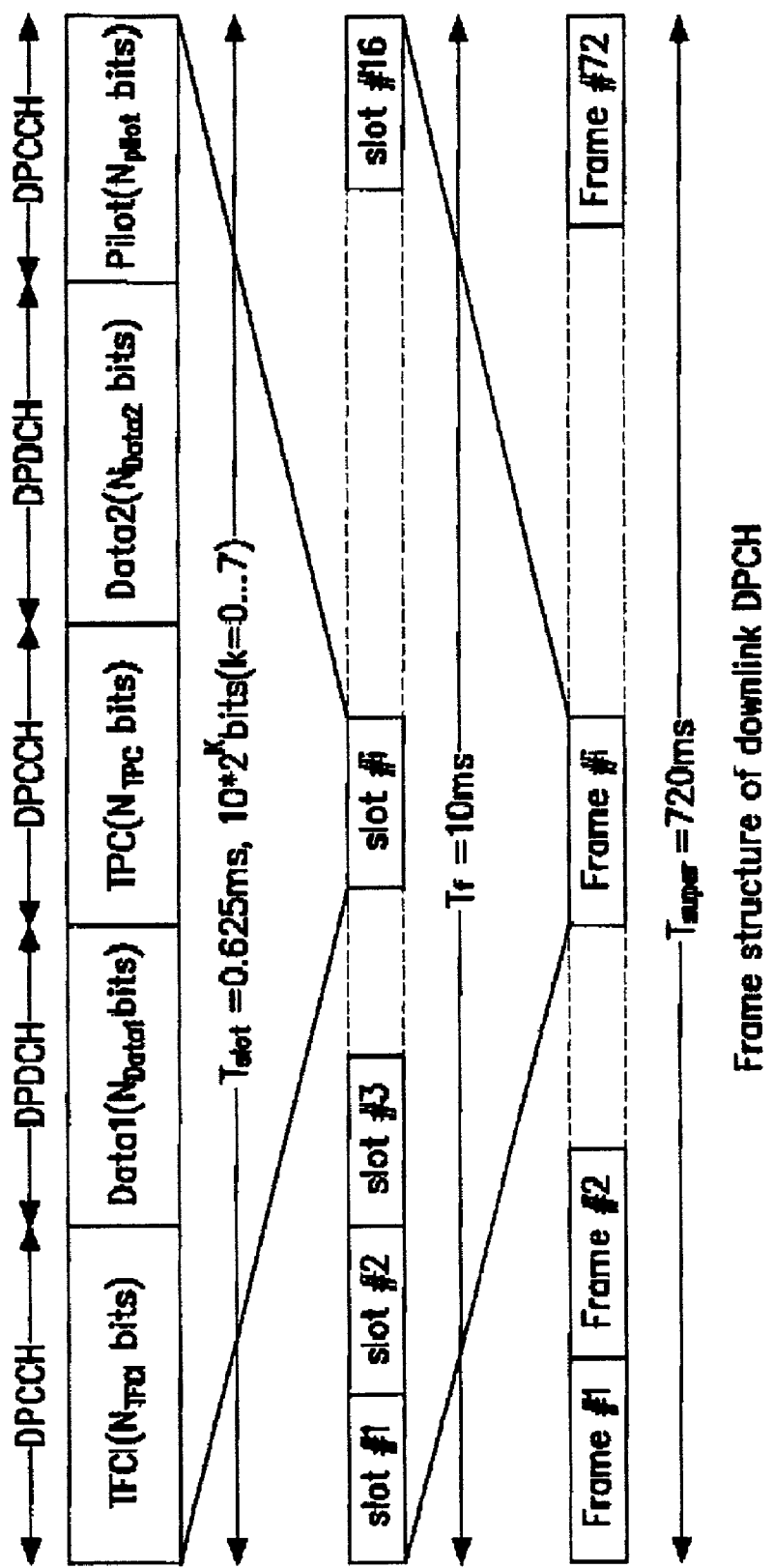
FIG. 8 is a diagram illustrating a signal transport format for a downlink DCH.

The multiplexed signals are then applied to a multiplexer 420 where they are time-multiplexed with other signals such as transport power control (TPC) bits and pilot bits as shown in FIG. 8. A spreader 430 channel-spreads the multiplexed symbols with a spreading code provided from a spreading code generator 435 in a symbol unit for channelization, and outputs the channel-spread signals in a chip unit. A scrambler 440 scrambles the channel-spread signals with a scrambling code provided from a scrambling code generator 445.

Figure 6:
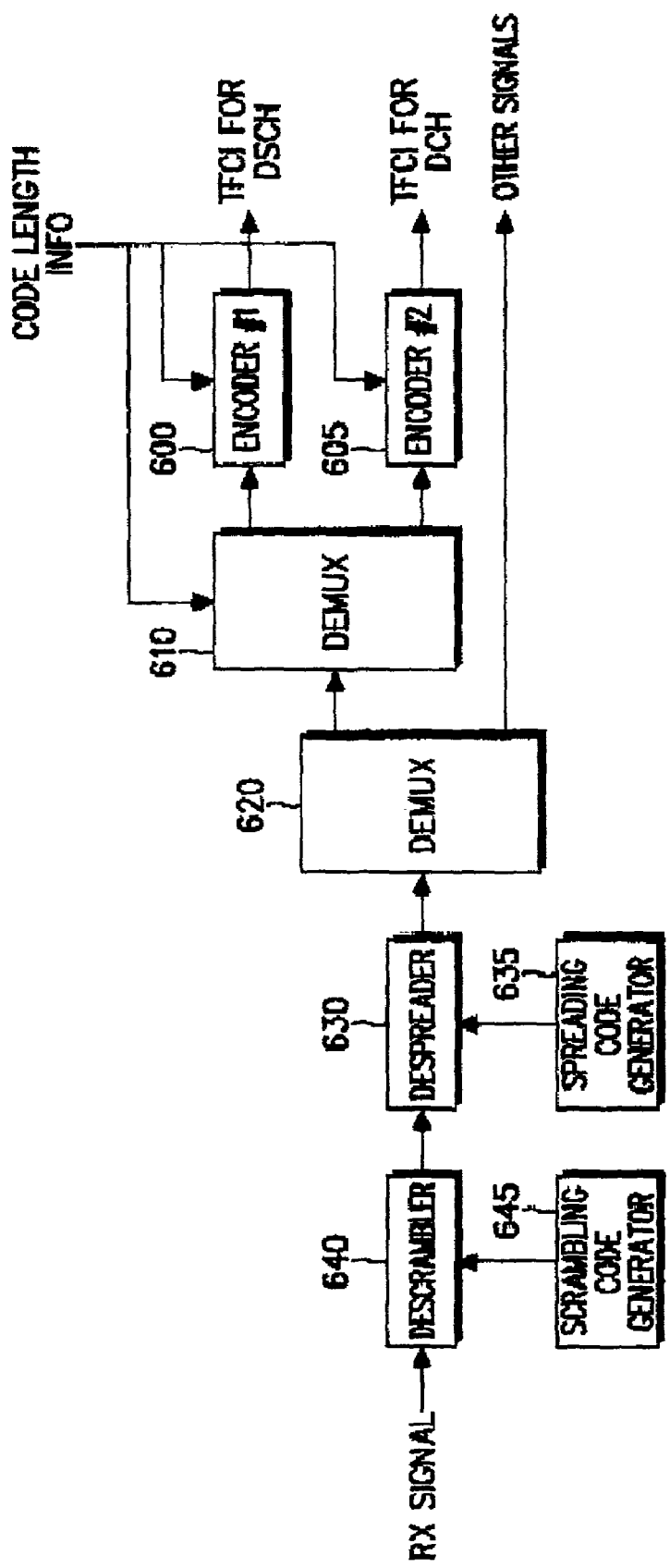
FIG. 6 is a block diagram illustrating a structure of a receiver for decoding coded symbols according to an embodiment of the present invention.

FIG. 6 illustrates a structure of a receiver according to an embodiment of the present invention. Referring to FIG. 6, a received signal is descrambled by a descrambler 640 with a scrambling code provided from a scrambling code generator 645. The descrambled symbols are despread by a despreader 630 with a spreading code provided from a despreading code generator 635. The despread received signal is demultiplexed by a demultiplexer 620 into the TFCI bits and other signals such as the TPC bits, pilot bits and a feedback signal. The demultiplexed TFCI symbols are demultiplexed again by a demultiplexer 610 into coded TFCI symbols for the DSCH and coded TFCI symbols for the DCH depending on code length control information based on an information bit ratio of the TFCI bits for the DSCH to the TFCI bits for the DCH, and then, provided to associated decoders 600 and 605, respectively. The decoders 600 and 605 decode the coded TFCI symbols for the DSCH and the coded TFCI symbols for the DCH, respectively, depending on the code length control information based on the information bit ratio of the TFCI bits for the DSCH to the TFCI bits for the DCH, and then, output the TFCI bits for the DSCH and the TFCI bits for the DCH, respectively.

FIG. 7 illustrates a detailed structure of the decoders 600 and 605. Referring to FIG. 7, received symbols r(t) are provided to the zero inserter 700, and at the same time, code length information is provided to the controller 770. The controller 770 stores puncturing position information based on a code length of the received symbols, and provides the stored puncturing position information to the zero inserter 700. For example, the controller 770 provides the zero inserter 700 with information on 29 puncturing positions for a coding rate (3,1), information on 26 puncturing positions for a coding rate (6,2), information on 23 puncturing positions for a coding rate (9,3), information on 20 puncturing positions for a coding rate (12,4), information on 14 puncturing positions for a coding rate (18,6), information on 11 puncturing positions for a coding rate (21,7), information on 8 puncturing positions for a coding rate (24,8), and information on 5 puncturing positions for a coding rate (27,9). For the respective cases, the puncturing positions are the same as given in the description of the encoders. The zero inserter 700 inserts 0s in the puncturing positions according to the puncturing position control information, and then, outputs a symbol stream of length 32. The symbol stream is provided to the inverse fast Hadamard transform part (IFHT) 720 and multipliers 701 to 715. The signals provided to the multipliers 701 to 715 are multiplied by mask functions M1 to M15 generated from the basis codeword M1, M2, M4, M8 at mask generator 710, respectively. The output symbols of the multipliers 701 to 715 are provided to switches 751 to 765, respectively. At this moment, the controller 770 provides the switches 751 to 765 with control information indicating use/nonuse of the mask functions based on the received code length information. For the (3,1), (6,2), (9,3), (12,4) and (18,6) encoders which do not use the mask functions, the switches 752, 754 and 756 are all disconnected according to the control information. For the (21,7) encoder which uses only one basis codeword, only the switch 752 is connected, and controlled according to the number of mask functions used based on the coding rate. Then, the IFHTs 720, 724 and 726 each perform IFHT on their received 32 symbols, and calculate correlations and an index of a Walsh code having the highest correlation among correlations between Walsh codes and 0 (since the signal provided to the IFHT 720 is not multiplied by any mask function) indicating an index of a mask function multiplied by the received signal. to obtain a correlation values between the received 32 symbols and length 32 Walsh codes. The correlation comparator 740 then compares the correlation values provided from the IFHTs. It can be achieved decoded TFCI bits from the Walsh index (5 bits) and the codeword index (2 bits) correspondent to the most high correlation value. The decoded TFCI bits are combination of the Walsh index and the codeword index.

Hitherto, the structure and operation of the hard split scheme has been described. Now, a method for achieving the objects of the present invention will be described with reference to FIGS. 10 to 13.

Figure 10:
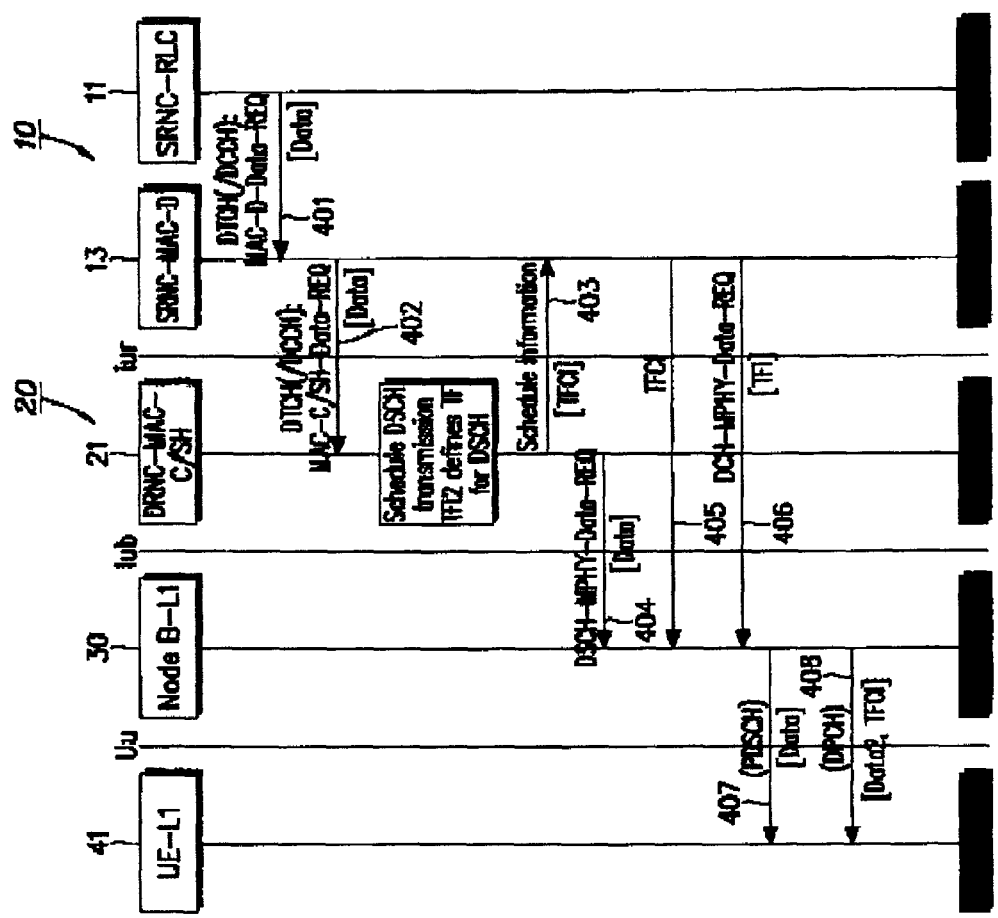
FIG. 10 is a flow diagram illustrating a procedure for exchanging signaling messages and data between a Node B and RNCs for the logical split technique wherein an SRNC is not identical to a DRNC.
Figure 11:
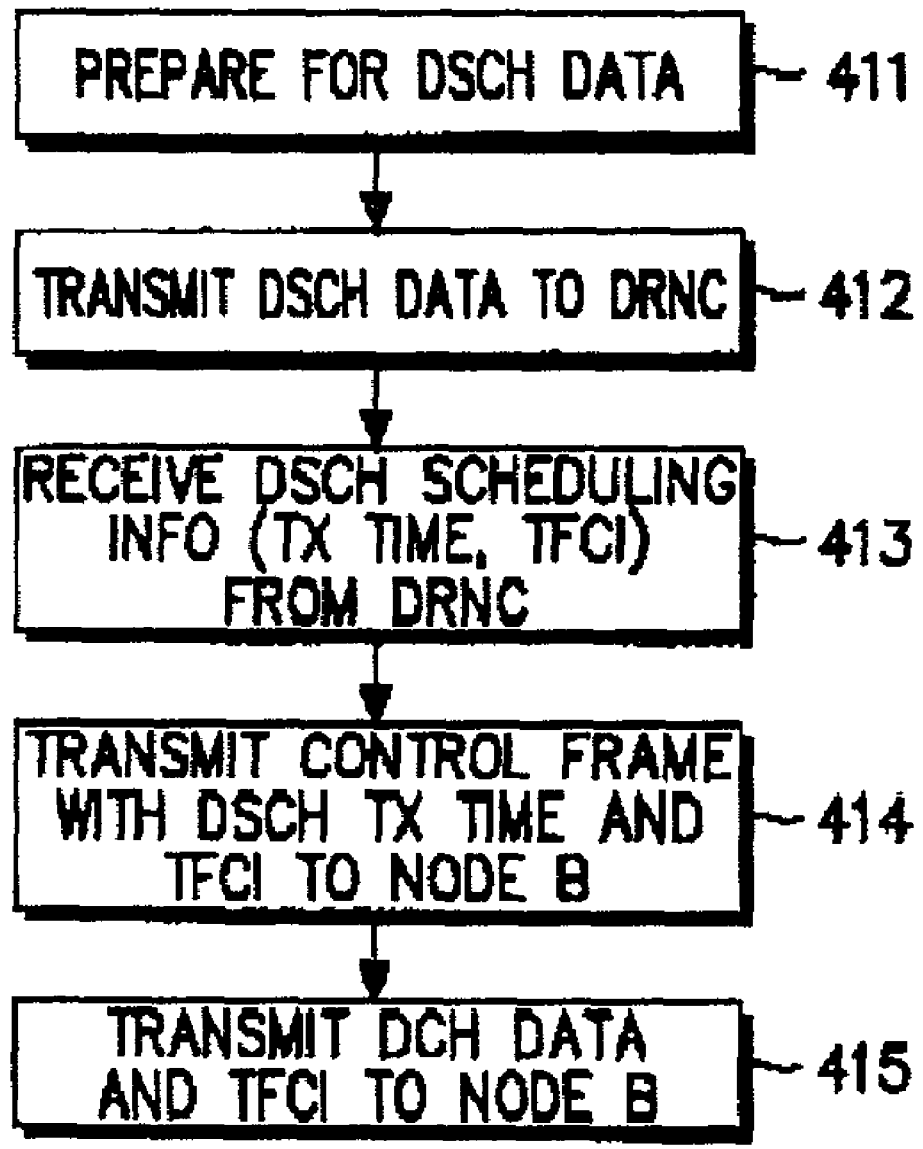
FIG. 11 is a flow chart illustrating an operation of the SRNC according to an embodiment of the present invention.
Figure 12:
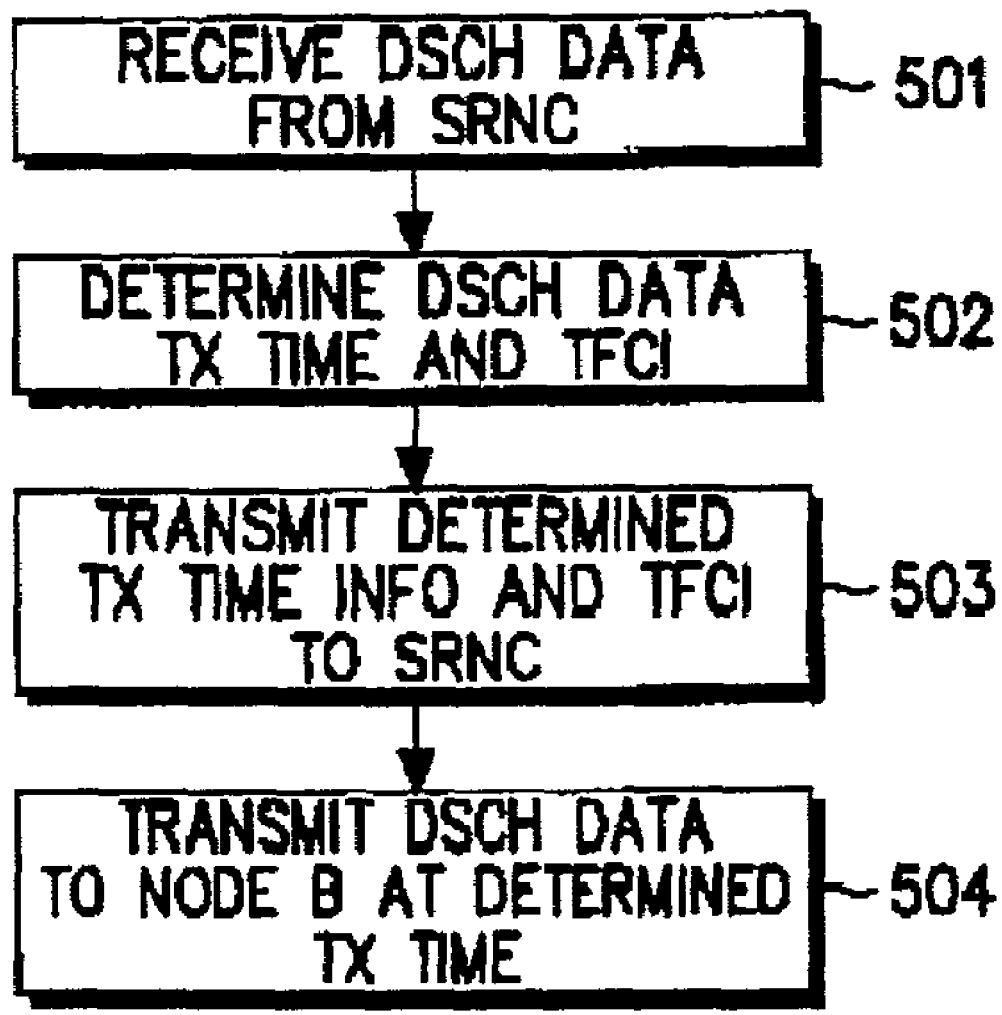
FIG. 12 is a flow chart illustrating an operation of the DRNC according to an embodiment of the present invention.
Figure 13:
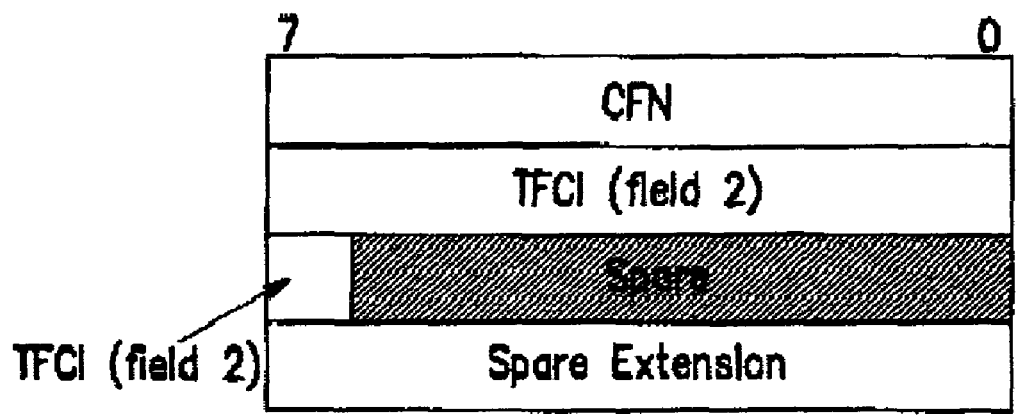
FIG. 13 is a diagram illustrating a structure of a control frame including information transmitted from the DRNC to the SRNC, shown in FIG. 8.

FIG. 10 illustrates a procedure for exchanging signaling messages and data between a Node B and RNCs for the logical split technique. FIG. 11 illustrates an operation of the SRNC according to an embodiment of the present invention. FIG. 12 illustrates an operation of the DRNC according to an embodiment of the present invention. FIG. 13 illustrates a structure of a control frame including information transmitted from the DRNC to the SRNC, shown in FIG. 8.

Referring first to FIG. 10, when there is DSCH data to transmit, RLC 11 of the SRNC 10 transmits the DSCH data to MAC-D 13 of the SRNC 10 in step 401. Upon receipt of the DSCH data from the RLC 11, the MAC-D 13 of the SRNC 10 transmits the received DSCH data to MAC-C/SH 21 of the DRNC 20 in step 402. At this moment, the DSCH data is transmitted using a frame protocol on the Iur. Upon receipt of the DSCH data, the MAC-C/SH 21 of the DRNC 20 determines a transmission time of the DSCH data and then transmits the determined transmission time information and the TFCI for the DSCH data to the MAC-D 13 of the SRNC 10, in step 403. After transmitting the transmission time information and the TFCI for the DSCH data to the MAC-D 13 of the SRNC in the step 403, the MAC-C/SH 21 of the DRNC 20 transmits the DSCH data to L1 30 of the Node B in step 404. At this moment, the DSCH data is transmitted at the transmission time determined (scheduled) in the step 403. Upon receipt of the transmission time information and the TFCI for the DSCH data from the MAC-C/SH 21 of the DRNC 20, the MAC-D 13 of the SRNC 10 transmits the TFCI along with the transmission time information to the L1 30 of the Node B before the transmission time, in step 405. At this moment, the data is transmitted using a control frame. Further, the MAC-D 13 of the SNRC 10 determines DCH data and TFCI for the DCH, and transmits them to the L1 30 of the Node B, in step 406. The DSCH data transmitted in the step 404 and the TFCI transmitted in the step 405 are related to the transmission time determined in the step 403. That is, the TFCI transmitted in the step 405 is transmitted to the UE over the DPCCH in a frame immediately before the DSCH data is transmitted over the PDSCH in the step 404. In the steps 404, 405 and 406, the data and TFCI are transmitted using a frame protocol. Particularly, in the step 406, the TFCI is transmitted through a control frame. Upon receipt of the data and TFCI transmitted in the steps 404, 405 and 406, the L1 30 of the Node B transmits the DSCH data to L1 41 of the UE over the DPSCH in step 407. Further, the L1 30 of the Node B transmits the TFCI to the L1 41 of the UE over the DPCH in step 408. At this moment, the L1 30 of the Node B creates one TFCI using the TFCIs or TFIs received in the steps 405 and 406, and then transmits the created TFCI using the DPCCH.

FIG. 11 illustrates an operation of the SRNC according to an embodiment of the present invention. Referring to FIG. 11, in step 411, the SRNC prepares for DSCH data to transmit. After preparation for the DSCH data to transmit, the SRNC transmits the DSCH data to the DRNC through the RLC and the MAC-D in step 412. After transmission of the DSCH data to the DRNC in the step 412, the SRNC receives scheduling information for the DSCH data, i.e., the transmission time information and the TFCI, in step 413. At this moment, the scheduling information can be received using a control frame.

In FIG. 13, CFN (Connection Frame Number) indicates a unique number of the frame to be transmitted, and this is the information on the transmission time when the DSCH data is to be transmitted. Further, TFCI (field #2) of FIG. 13 indicates TFCI information for the DSCH data to be transmitted.

Referring back to FIG. 11, in step 414, the SRNC transmits to the Node B a control frame filled with the transmission time information and the TFCI information for the DSCH. The control frame should arrive at the Node B before the transmission time. In step 415, the SRNC transmits DCH data along with the TFCI for the DCH to the Node B.

FIG. 12 illustrates an operation of the DRNC according to an embodiment of the present invention. Referring to FIG. 12, in step 501, the DRNC receives the DSCH data transmitted by the SRNC in the step 413 of FIG. 11. Upon receipt of the DSCH data, the DRNC schedules the DSCHs received from a plurality of RNCs in step 502. That is, the DRNC determines (schedules) transmission times where the DSCHs received from a plurality of the RNCs and the DSCH created by the DRNC itself are to be transmitted, and also schedules TFI or TFCI considering a channel to be used during the transmission. After scheduling the transmission times and the TFI or TFCI in the step 502, the DRNC transmits the scheduled transmission time information and TFCI information to the SRNC using the control frame in step 503. The control frame transmitted at this moment has the structure of FIG. 8. After transmission of the scheduled time information and TFCI information, the DRNC transmits the DSCH data to the Node B at the scheduled time in step 504.

As described above, the embodiment of the present invention can encode/decode various types of the TFCI bits using a single encoder/decoder structure. In addition, the embodiment multiplexes the TFCI symbols encoded in the different coding techniques, such that the TFCI symbols should be uniformly distributed before transmission. For the 10 input bits, the TFCI coding is performed in a selected one of the ratios of 1:9, 2:8, 3:7, 4:6, 5:5, 6:4, 7:3, 8:2, and 9:1 depending on the transmission data bits of the DSCH and the DCH. In addition, if the SRNC is separated from the DRNC in the logical split mode, the embodiment of the present invention can transmit scheduling information from the MAC-C/SH of the DRNC to the MAC-D of the SNRC. In addition, the embodiment can transmit a signaling message so as to separately use the hard split technique and the logical split technique, which are different techniques for transmitting the TFCI for the DSCH.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for transmitting TFCI (Transport Format Combination Indicator) bits in a CDMA (Code Division Multiple Access) mobile communication system including a UE (User Equipment) and a Node B for transmitting packet data to the UE over a first channel, encoding TFCI bits depending on information bits of the first channel and information bits of a second channel established to transmit the packet data over first channel, and transmitting the encoded TFCI bits over the second channel, comprising:
    a first TFCI bit generator for creating first TFCI bits depending on information bits of the first channel;
    a second TFCI bit generator for creating second TFCI bits depending on information bits of the second channel; and
    an encoder for encoding the first TFCI bits and the second TFCI bits and puncturing the encoded first TFCI bits and second TFCI bits according to first and second puncturing positions respectively such that a remained number of encoded first TFCI bits to a remained number of encoded second TFCI bits is variable based upon the ratio of the first TFCI bits and the second TFCI bits.

2. The apparatus as claimed in claim 1, wherein the first channel is a downlink shared channel (DSCH) and the second channel is a dedicated channel (DCM).

3. The apparatus as claimed in claim 1, wherein the first puncturing positions are $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31^{st}$ coded symbols among a total of 32 encoded first symbols of $0^{th}$ to $31^{st}$ symbols and second puncturing positions are $0^{th}$, $2^{nd}$, $8^{th}$, $19^{th}$ and $20^{th}$ coded symbols among a total of 32 encoded second symbols of $0^{th}$ to $31^{st}$ symbols when the number of first TFCI bits is 1 and the number of second TFCI bits are 9.

4. The apparatus as claimed in claim 1, wherein the first puncturing positions are $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and second puncturing positions are $1^{st}$, $7^{th}$, $13^{th}$, $15^{th}$, $20^{th}$, $25^{th}$, $30^{th}$ and $31^{st}$ coded symbols among a total of 32 encoded second symbols of $0^{th}$ to $31^{st}$ symbols when the number of first TFCI bits are 2 and the number of second TFCI bits are 8.

5. The apparatus as claimed in claim 1, wherein the first puncturing positions are $7^{th}$, $8^{th}$, $11^{th}$, $12^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and second puncturing positions are $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 encoded second symbols of $0^{th}$ to $31^{st}$ symbols when the number of first TFCI bits are 3 and the number of second TFCI bits are 7.

6. The apparatus as claimed in claim 1, wherein the first puncturing positions are $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and second puncturing positions are $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 encoded second symbols of $0^{th}$ to $31^{st}$ symbols when the number of first TFCI bits are 4 and the number of second TFCI bits are 6.

7. An apparatus for encoding TFCI (Transport Format Combination Indicator) bits in a CDMA mobile communication system including a UE and a Node B for transmitting packet data to the UE over a first channel, encoding TFCI bits depending on information bits of the first channel and information bits of a second channel established to transmit the packet data over the first channel, and transmitting the encoded TFCI bits over the second channel, comprising:
 a TFCI bit generator for creating the TFCI bits, the number of which is variable depending on an information bit ratio of the first channel to the second channel;
 a code length information generator for generating code length information for setting a length of a codeword according to the information bit ratio;
 a Walsh code generator for generating first to fifth basis Walsh codewords;
 a sequence generator for generating an all-1 sequence;
 a mask generator for generating first to fourth basis masks; first to tenth multipliers for multiplying the TFCI bits by the first to fifth basis Walsh codewords, the all-1 sequence and the first to fourth basis masks, respectively;
 an adder for adding outputs of the first to tenth multipliers; and
 a puncturer for puncturing a codeword output from the adder according to the code length information.

8. The apparatus as claimed in claim 7, wherein the first channel is a downlink shared channel (DSCH) and the second channel is a dedicated channel (DCH).

9. An apparatus for receiving TFCI (Transport Format Combination Indicator) bits in a CDMA mobile communication system including a UE and a Node B for transmitting packet data to the UE over a first channel, encoding TFCI bits for the first channel into first TFCI symbols and TFCI bits for a second channel established to transmit control information for the first channel into second TFCI symbols, and transmitting the first and second TFCI symbols over the second channel, comprising:
 a demultiplexer for demultiplexing received TFCI symbols into a first TFCI symbols and
 a second TFCI symbols; and
 a decoder for inserting zeros in the first TFCI symbols and the second TFCI symbols at first and second predetermined positions respectively, and decoding the zero-inserted first and second TFCI symbols by using inverse fast Hadamard transform(IFHT).

10. The apparatus as claimed in claim 9, wherein the first channel is a downlink shared channel (DSCH) and the second channel is a dedicated channel (DCH).

11. The apparatus as claimed in claim 9, wherein the first positions are $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31^{st}$ coded symbols among a total of 32 encoded first symbols of $0^{th}$ to $31^{st}$ symbols and second puncturing positions are $0^{th}$, $2^{nd}$, $8^{th}$, $19^{th}$ and $20^{th}$ coded symbols among a total of 32 encoded second symbols of $0^{th}$ to $31^{st}$ symbols when the number of first TFCI bits is 1 and the number of second TFCI bits are 9.

12. The apparatus as claimed in claim 9, wherein the first puncturing positions are $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and second puncturing positions are $1^{st}$, $7^{th}$, $13^{th}$, $15^{th}$, $20^{th}$, $25^{th}$, $30^{th}$ and $31^{st}$ coded symbols among a total of 32 encoded second symbols of $0^{th}$ to $31^{st}$ symbols when the number of first TFCI bits are 2 and the number of second TFCI bits are 8.

13. The apparatus as claimed in claim 9, wherein the first positions are $7^{th}$, $8^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second positions are $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 encoded second symbols of $0^{th}$ to $31^{st}$ symbols when the number of first TFCI bits are 3 and the number of second TFCI bits are 7.

14. The apparatus as claimed in claim 9, wherein the first positions are $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second positions are $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 encoded second symbols of $0^{th}$ to $31^{st}$ symbols when the number of first TFCI bits are 4 and the number of second TFCI bits are 6.

15. A method for transmitting TFCI_(Transport Format Combination Indicator) bits in a CDMA mobile communication system including a UE and a Node B for transmitting packet data to the UE over a first channel, first and second encoded TFCI bits over a second channel established to transmit control data for the first channel, comprising the steps of:
 encoding a first TFCI bits representing a transport format combination of the first channel to generate first encoded symbols and a second TFCI bits representing a transport format combination of the second channel to generate second encoded symbols respectively; and
 puncturing the first encoded symbols and the second encoded symbols according to first and second puncturing positions to generate the first encoded TFCI bits and the second encoded TFCI bits;
 multiplexing the first encoded TFCI bits and the second encoded TFCI bits; and
 transmitting the multiplexed encoded TFCI bits over the second channel.

16. The method as claimed in claim 15, wherein the first channel is a downlink shared channel (DSCH) and the second channel is a dedicated channel (DCH).

17. The apparatus as claimed in claim 15, wherein the first puncturing positions are $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31^{st}$ coded symbols among a total of 32 encoded first symbols of $0^{th}$ to $31^{st}$ symbols and the second puncturing positions are $0^{th}$, $2^{nd}$, $8^{th}$, $19^{th}$ and $20^{th}$ coded symbols among a total of 32 encoded second symbols of $0^{th}$ to $31^{st}$ symbols when the number of first TFCI bits is 1 and the number of second TFCI bits are 9.

18. The apparatus as claimed in claim 15, wherein the first puncturing positions are $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, and $31^{st}$ coded symbols among a total of 32 encoded first symbols of $0^{th}$ to $31^{st}$ symbols and the second puncturing positions are $1^{st}$, $7^{th}$, $13^{th}$, $15^{th}$, $20^{th}$, $25^{th}$, $30^{th}$ and $31^{st}$ coded symbols among a total of 32 encoded second symbols of $0^{th}$ to $31^{st}$ symbols when the number of first TFCI bits is 2 and the number of second TFCI bits are 8.

19. The apparatus as claimed in claim 15, wherein the first puncturing positions are $7^{th}$, $8^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, and $31^{st}$ coded symbols among a total of 32 encoded first symbols of $0^{th}$ to $31^{st}$ symbols and the second puncturing positions are $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 encoded second symbols of $0^{th}$ to $31^{st}$ symbols when the number of first TFCI bits is 3 and the number of second TFCI bits are 7.

20. The apparatus as claimed in claim 15, wherein the first puncturing positions are $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second puncturing positions are $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 encoded second symbols of $0^{th}$ to $31^{st}$ symbols when the number of first TFCI bits are 4 and the number of second TFCI bits are 6.

21. A method for receiving TFCI(Transport Format Combination Indicator) bits in a CDMA mobile communication system including a UE and a Node B for transmitting packet data to the UE over a first channel, first and second encoded TFCI bits over a second channel established to transmit control data for the first channel, comprising the steps of:
demultiplexing received encoded TFCI bits into the first encoded TFCI bits and the second encoded TFCI bits;
inserting zeros in the first encoded TFCI bits and second encoded TFCI bits at first and second predetermined positions respectively; and
decoding the zero-inserted first and second TFCI bits.

22. The method as claimed in claim 21, wherein the first channel is a downlink shared channel (DSCH) and the second channel is a dedicated channel (DCH).

23. The apparatus as claimed in claim 21, wherein the first positions are $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31^{st}$ coded symbols among a total of 32 encoded first symbols of $0^{th}$ to $31^{st}$ symbols and the second positions are $0^{th}$, $2^{nd}$, $8^{th}$, $19^{th}$ and $20^{th}$ coded symbols among a total of 32 encoded second symbols of $0^{th}$ to $31^{st}$ symbols when the number of first TFCI bits is 1 and the number of second TFCI bits are 9.

24. The apparatus as claimed in claim 21, wherein the first positions are $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second positions are $1^{st}$, $7^{th}$, $13^{th}$, $15^{th}$, $20^{th}$, $25^{th}$, $30^{th}$ and $31^{st}$ coded symbols among a total of 32 encoded second symbols of $0^{th}$ to $31^{st}$ symbols when the number of first TFCI bits are 2 and the number of second TFCI bits are 8.

25. The apparatus as claimed in claim 21, wherein the first positions are $7^{th}$, $8^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second positions are $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 encoded second symbols of $0^{th}$ to $31^{st}$ symbols when the number of first TFCI bits are 3 and the number of second TFCI bits are 7.

26. The apparatus as claimed in claim 21, wherein the first positions are $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second positions are $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 encoded second symbols of $0^{th}$ to $31^{st}$ symbols when the number of first TFCI bits are 4 and the number of second TFCI bits are 6.

27. A method for encoding TFCI bits for a first channel and TFCI (Transport Format Combination Indicator) bits for a second channel depending on an information bits ratio of the first channel to the second channel first channel TFCI and the second channel TFCI in a CDMA mobile communication system, comprising the steps of:
creating m first TFCI bits based on data of the first channel and n second TFCI bits based on data of the second channel;
encoding the first TFCI bits and puncturing the encoded first symbols according to a first puncturing positions of the first channel to generate first encoded TFCI symbols;
encoding the second TFCI bits, and puncturing the encoded second symbols according to a second puncturing positions of the second channel to generate second encoded TFCI symbols; and
multiplexing the first encoded TFCI symbols and the second encoded TFCI symbols so as to uniformly distribute the first and second TFCI symbols.

28. The apparatus as claimed in claim 27, wherein the first puncturing positions are $1^{st}$, $3^{rd}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, $31^{st}$ coded symbols among a total of 32 encoded first symbols of $0^{th}$ to $31^{st}$ symbols and the second puncturing positions are $0^{th}$, $2^{nd}$, $8^{th}$, $19^{th}$ and $20^{th}$ coded symbols among a total of 32 encoded second symbols of $0^{th}$ to $31^{st}$ symbols when the number of first TFCI bits is 1 and the number of second TFCI bits are 9.

29. The apparatus as claimed in claim 27, wherein the first puncturing positions are $3^{rd}$, $7^{th}$, $8^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, and $31^{st}$ coded symbols among a total of 32 encoded first symbols of $0^{th}$ to $31^{st}$ symbols and the second puncturing positions are $1^{st}$, $7^{th}$, $13^{th}$, $15^{th}$, $20^{th}$, $25^{th}$, $30^{th}$ and $21^{st}$ coded symbols among a total of 32 encoded second symbols of $0^{th}$ to $31^{st}$ symbols when the number of first TFCI bits is 2 and the number of second TFCI bits are 8.

30. The apparatus as claimed in claim 27, wherein the first puncturing positions are $7^{th}$, $8^{th}$, $11^{th}$, $12^{th}$, $13^{th}$, $14^{th}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$, and $31^{st}$ coded symbols among a total of 32 encoded first symbols of $0^{th}$ to $31^{st}$ symbols and the second puncturing positions are $0^{th}$, $1^{st}$, $2^{nd}$, $3^{rd}$, $4^{th}$, $5^{th}$, $7^{th}$, $12^{th}$, $18^{th}$, $21^{st}$, $24^{th}$ coded symbols among a total of 32 encoded second symbols of $0^{th}$ to $31^{st}$ symbols when the number of first TFCI bits is 3 and the number of second TFCI bits are 7.

31. The apparatus as claimed in claim 27, wherein the first puncturing positions are $0^{th}$, $1^{st}$, $2^{nd}$, $15^{th}$, $16^{th}$, $17^{th}$, $18^{th}$, $19^{th}$, $20^{th}$, $21^{st}$, $22^{nd}$, $23^{rd}$, $24^{th}$, $25^{th}$, $26^{th}$, $27^{th}$, $28^{th}$, $29^{th}$, $30^{th}$ and $31^{st}$ coded symbols among a total of 32 encoded first symbols of $0^{th}$ to $31^{st}$ symbols and the second puncturing positions are $0^{th}$, $7^{th}$, $9^{th}$, $11^{th}$, $16^{th}$, $19^{th}$, $24^{th}$, $25^{th}$, $26^{th}$, $27^{th}$, $28^{th}$, $29^{th}$, $30^{th}$ and $31^{st}$ coded symbols among a total of 32 encoded second symbols of $0^{th}$ to $31^{st}$ symbols when the number of first TFCI bits are 4 and the number of second TFCI bits are 6.

* * * * *